(12) United States Patent
Takahashi

(10) Patent No.: US 10,511,463 B2
(45) Date of Patent: Dec. 17, 2019

(54) RECEPTION DEVICE, RECEPTION METHOD, AND COMMUNICATION SYSTEM

(71) Applicant: Sony Corporation, Tokyo (JP)

(72) Inventor: Hiroo Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 117 days.

(21) Appl. No.: 15/752,379

(22) PCT Filed: Aug. 12, 2016

(86) PCT No.: PCT/JP2016/073715
§ 371 (c)(1),
(2) Date: Feb. 13, 2018

(87) PCT Pub. No.: WO2017/043250
PCT Pub. Date: Mar. 16, 2017

(65) Prior Publication Data
US 2019/0007244 A1    Jan. 3, 2019

(30) Foreign Application Priority Data

Sep. 9, 2015    (JP) .................................. 2015-177241

(51) Int. Cl.
*H04L 25/493* (2006.01)
*H04L 1/00* (2006.01)

(52) U.S. Cl.
CPC .............. *H04L 25/493* (2013.01); *H04L 1/00* (2013.01); *H04L 1/0045* (2013.01); *H04L 1/0047* (2013.01); *H04L 1/0061* (2013.01)

(58) Field of Classification Search
CPC ....... H04L 25/493; H04L 1/00; H04L 1/0045; H04L 1/0047; H04L 1/0061

USPC .......................................................... 714/799
See application file for complete search history.

(56) References Cited

U.S. PATENT DOCUMENTS

| | | | | |
|---|---|---|---|---|
| 9,374,216 B2 * | 6/2016 | Sengoku | ................ | H03K 3/017 |
| 9,673,968 B2 * | 6/2017 | Sengoku | ................ | H03K 3/017 |
| 10,284,398 B2 * | 5/2019 | Yokokawa | ................ | H04L 7/02 |
| 2006/0187961 A1 * | 8/2006 | Kai | ..................... | H04L 63/0428 |
| | | | | 370/469 |

(Continued)

FOREIGN PATENT DOCUMENTS

| | | |
|---|---|---|
| JP | 2010-520715 A | 6/2010 |
| JP | 2010-258985 A | 11/2010 |
| JP | 2013-123087 A | 6/2013 |

*Primary Examiner* — John J Tabone, Jr.
(74) *Attorney, Agent, or Firm* — Michael Best & Friedrich LLP

(57) ABSTRACT

A reception device according to the present disclosure includes: a receiver that generates a symbol signal indicating a sequence of symbols on the basis of a plurality of transmission signals; a transition signal generator that generates a transition signal indicating a sequence of symbol transitions on the basis of the symbol signal; and a converter that repeats an operation of converting transition data including a predetermined number of the symbol transitions into reception data to convert the sequence of the symbol transitions into a sequence of reception data, and generates, in a case where the sequence of the symbol transitions includes first transition data that is not convertible into the reception data, candidate data as a candidate of the reception data on the basis of the first transition data.

12 Claims, 22 Drawing Sheets

(56) References Cited

U.S. PATENT DOCUMENTS

| | | | | |
|---|---|---|---|---|
| 2008/0212709 A1* | 9/2008 | Wiley | ................... | H04L 5/20 |
| | | | | 375/286 |
| 2010/0275092 A1* | 10/2010 | Ogiso | ............... | H04L 25/4917 |
| | | | | 714/752 |
| 2014/0286466 A1* | 9/2014 | Sengoku | ............... | H03K 3/017 |
| | | | | 375/354 |
| 2016/0261400 A1* | 9/2016 | Sengoku | ............... | H03K 3/017 |
| 2019/0007244 A1* | 1/2019 | Takahashi | ............ | H04L 1/0045 |

\* cited by examiner

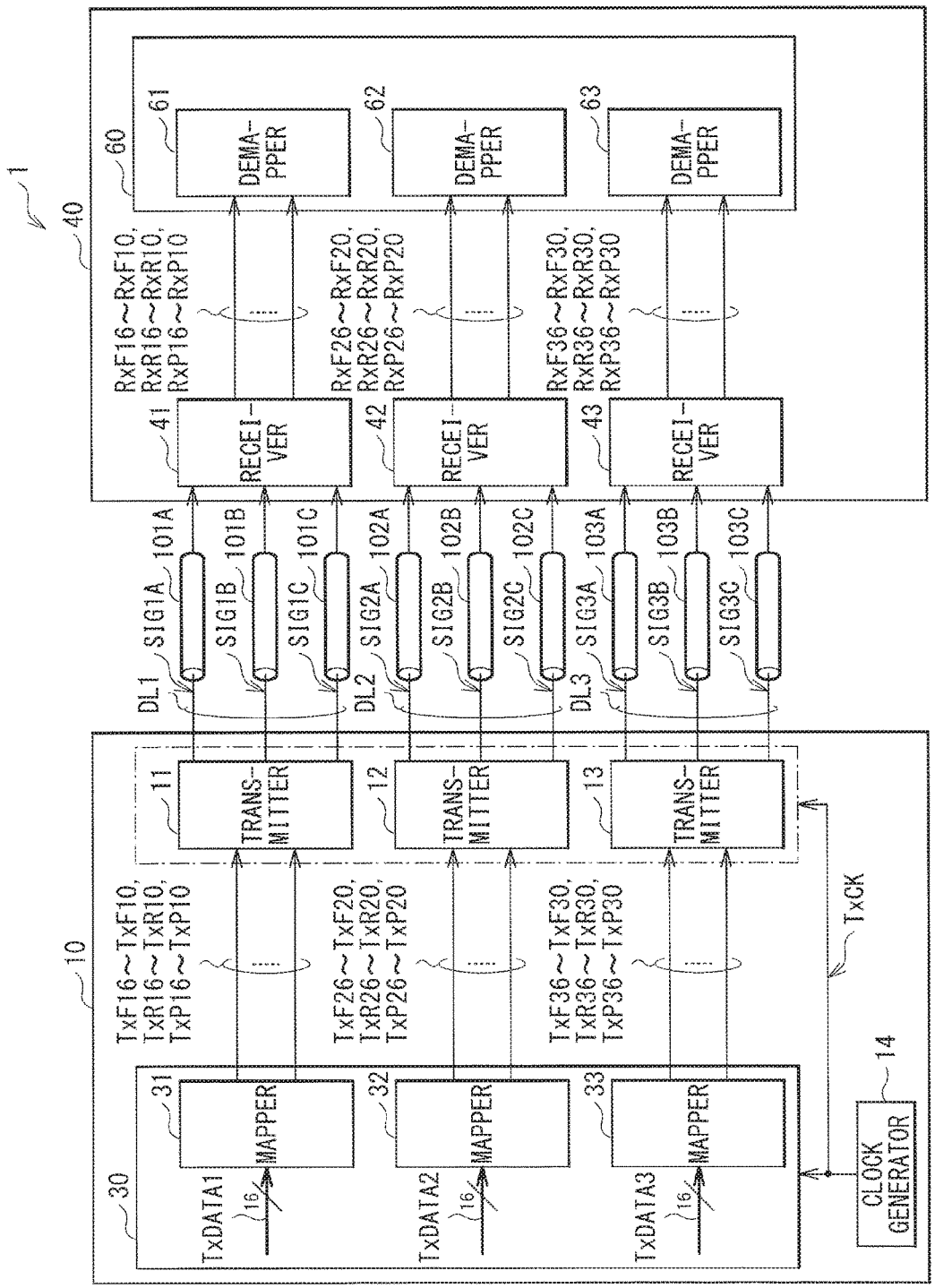
[ FIG. 1 ]

[FIG. 2]
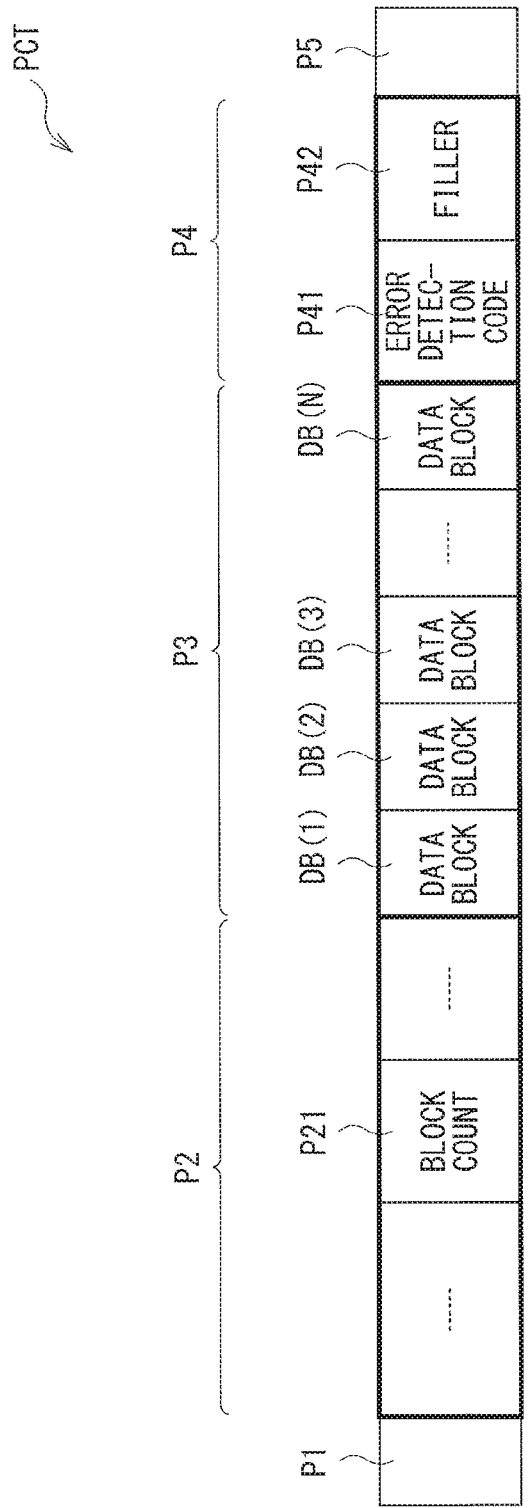

[FIG. 3]
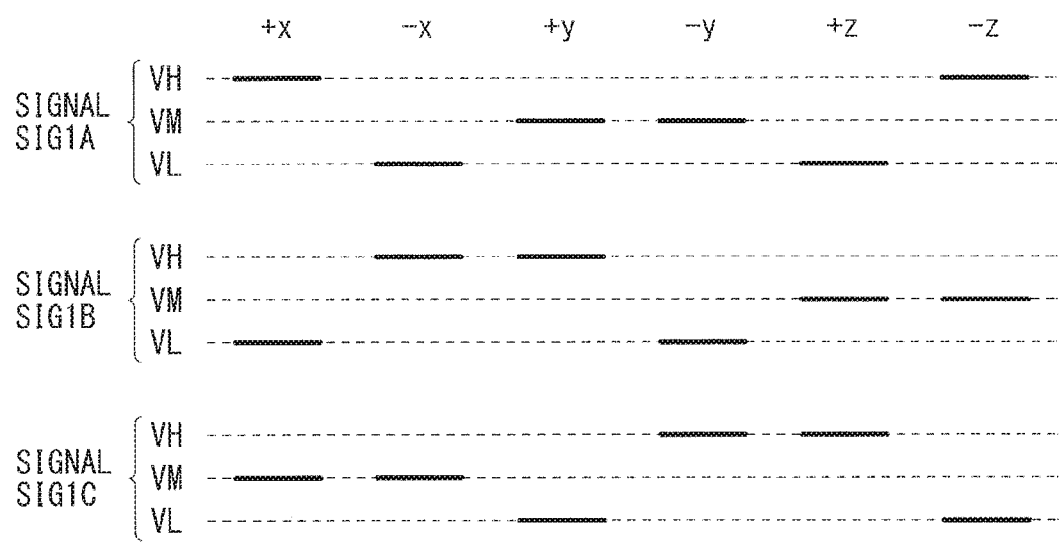

[FIG. 4]
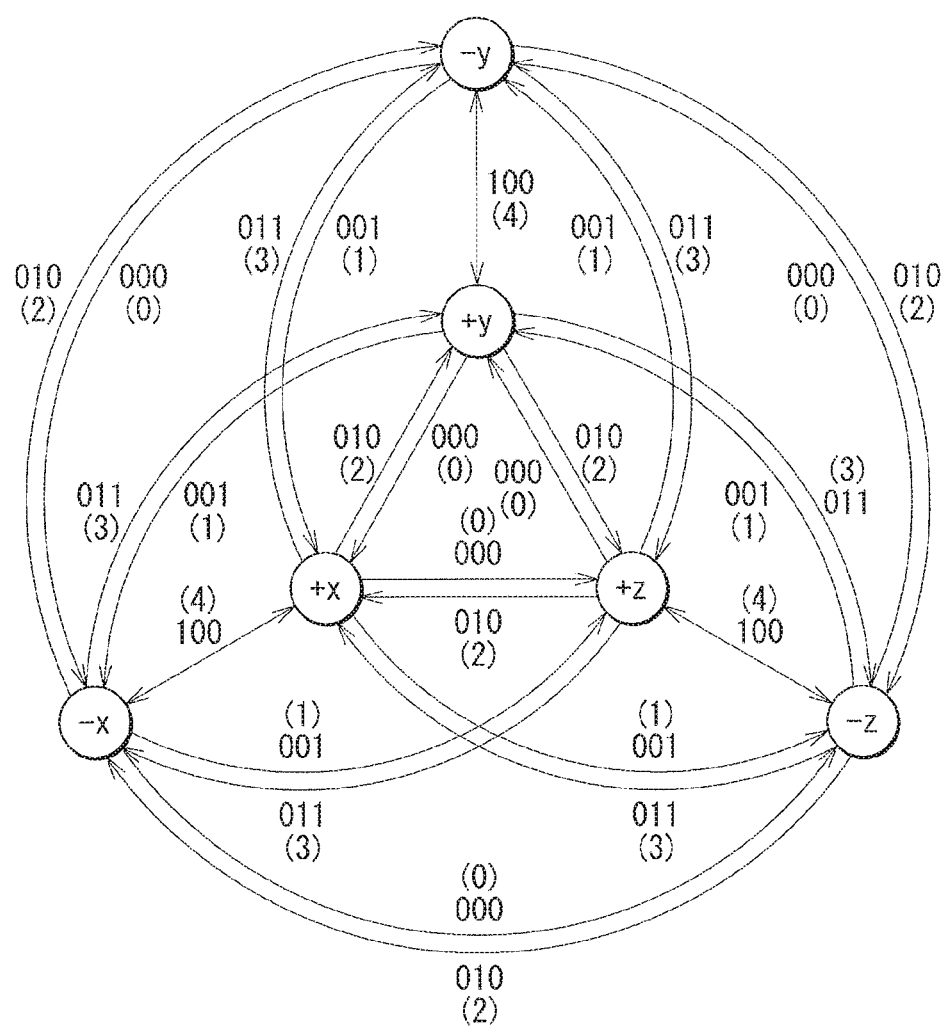

[ FIG. 5 ]

| TxF16~TxF10 (RxF16~RxF10) | TxDATA1 (RxDATA1) |
|---|---|
| 1,0,1,0,0,0,0 | 1,1,1,1,1,1,0,ro5,po5,ro3,po3,ro2,po2,ro1,po1,ro0,po0 |
| 0,1,1,0,0,0,0 | 1,1,1,1,1,1,0,ro6,po6,ro3,po3,ro2,po2,ro1,po1,ro0,po0 |
| 1,0,0,1,0,0,0 | 1,1,1,1,1,0,1,ro5,po5,ro4,po4,ro2,po2,ro1,po1,ro0,po0 |
| 0,1,0,1,0,0,0 | 1,1,1,1,1,0,1,ro6,po6,ro4,po4,ro2,po2,ro1,po1,ro0,po0 |
| 0,0,1,1,0,0,0 | 1,1,1,1,1,0,0,ro6,po6,ro5,po5,ro2,po2,ro1,po1,ro0,po0 |
| 1,0,0,0,1,0,0 | 1,1,1,1,0,1,1,ro5,po5,ro4,po4,ro3,po3,ro1,po1,ro0,po0 |
| 0,1,0,0,1,0,0 | 1,1,1,1,0,1,1,ro6,po6,ro4,po4,ro3,po3,ro1,po1,ro0,po0 |
| 0,0,1,0,1,0,0 | 1,1,1,1,0,1,0,ro6,po6,ro5,po5,ro3,po3,ro1,po1,ro0,po0 |
| 0,0,0,1,1,0,0 | 1,1,1,1,0,0,1,ro6,po6,ro5,po5,ro4,po4,ro1,po1,ro0,po0 |
| 1,0,0,0,0,1,0 | 1,1,1,0,1,1,1,ro5,po5,ro4,po4,ro3,po3,ro2,po2,ro0,po0 |
| 0,1,0,0,0,1,0 | 1,1,1,0,1,1,1,ro6,po6,ro4,po4,ro3,po3,ro2,po2,ro0,po0 |
| 0,0,1,0,0,1,0 | 1,1,1,0,1,1,0,ro6,po6,ro5,po5,ro3,po3,ro2,po2,ro0,po0 |
| 0,0,0,1,0,1,0 | 1,1,1,0,1,0,1,ro6,po6,ro5,po5,ro4,po4,ro2,po2,ro0,po0 |
| 0,0,0,0,1,1,0 | 1,1,1,0,0,1,1,ro6,po6,ro5,po5,ro4,po4,ro3,po3,ro0,po0 |
| 1,0,0,0,0,0,1 | 1,1,0,1,1,1,1,ro5,po5,ro4,po4,ro3,po3,ro2,po2,ro1,po1 |
| 0,1,0,0,0,0,1 | 1,1,0,1,1,1,1,ro6,po6,ro4,po4,ro3,po3,ro2,po2,ro1,po1 |
| 0,0,1,0,0,0,1 | 1,1,0,1,1,1,0,ro6,po6,ro5,po5,ro3,po3,ro2,po2,ro1,po1 |
| 0,0,0,1,0,0,1 | 1,1,0,1,1,0,1,ro6,po6,ro5,po5,ro4,po4,ro2,po2,ro1,po1 |
| 0,0,0,0,1,0,1 | 1,1,0,1,0,1,1,ro6,po6,ro5,po5,ro4,po4,ro3,po3,ro1,po1 |
| 0,0,0,0,0,1,1 | 1,1,0,0,1,1,1,ro6,po6,ro5,po5,ro4,po4,ro3,po3,ro2,po2 |
| 1,0,0,0,0,0,0 | 1,0,1,1,1,1,0,ro5,po5,ro4,po4,ro3,po3,ro2,po2,ro1,po1,ro0,po0 |
| 0,1,0,0,0,0,0 | 1,0,1,1,1,1,0,ro6,po6,ro4,po4,ro3,po3,ro2,po2,ro1,po1,ro0,po0 |
| 0,0,1,0,0,0,0 | 1,0,1,1,1,0,0,ro6,po6,ro5,po5,ro3,po3,ro2,po2,ro1,po1,ro0,po0 |
| 0,0,0,1,0,0,0 | 1,0,1,1,0,1,0,ro6,po6,ro5,po5,ro4,po4,ro2,po2,ro1,po1,ro0,po0 |
| 0,0,0,0,1,0,0 | 1,0,1,0,1,1,0,ro6,po6,ro5,po5,ro4,po4,ro3,po3,ro1,po1,ro0,po0 |
| 0,0,0,0,0,1,0 | 1,0,0,1,1,1,0,ro6,po6,ro5,po5,ro4,po4,ro3,po3,ro2,po2,ro0,po0 |
| 0,0,0,0,0,0,1 | 0,1,1,1,1,1,0,ro6,po6,ro5,po5,ro4,po4,ro3,po3,ro2,po2,ro1,po1 |
| 0,0,0,0,0,0,0 | 0,0,ro6,po6,ro5,po5,ro4,po4,ro3,po3,ro2,po2,ro1,po1,ro0,po0 |

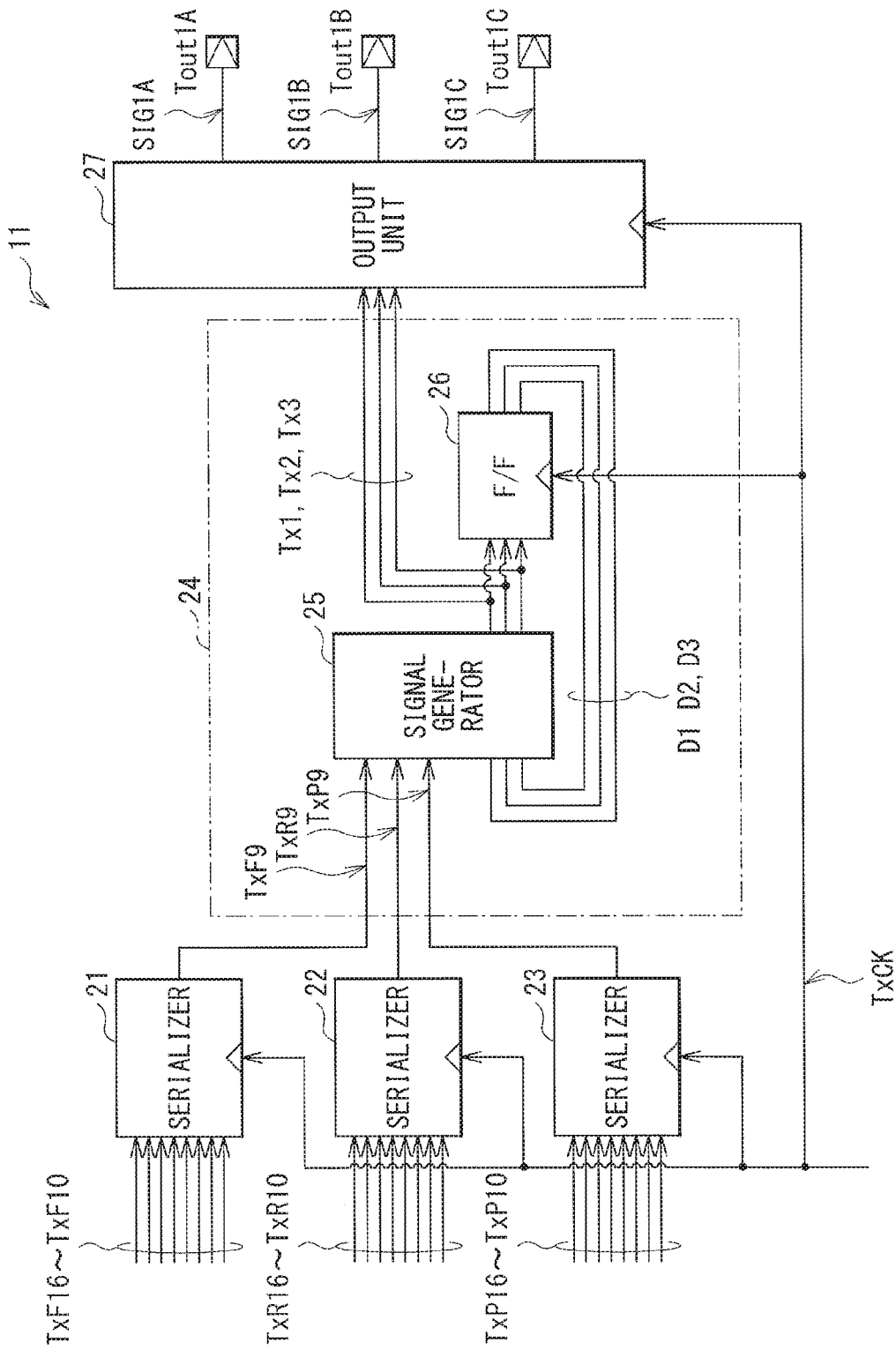
[FIG. 6]

[ FIG. 7 ]

| SYMBOL | SYMBOL SIGNAL Tx1 | SYMBOL SIGNAL Tx2 | SYMBOL SIGNAL Tx3 | SIGNAL SIG1A | SIGNAL SIG1B | SIGNAL SIG1C |
|---|---|---|---|---|---|---|
| +x | 1 | 0 | 0 | VH | VL | VM |
| −x | 0 | 1 | 1 | VL | VH | VM |
| +y | 0 | 1 | 0 | VM | VH | VL |
| −y | 1 | 0 | 1 | VM | VL | VH |
| +z | 0 | 0 | 1 | VL | VM | VH |
| −z | 1 | 1 | 0 | VH | VM | VL |

[FIG. 8]
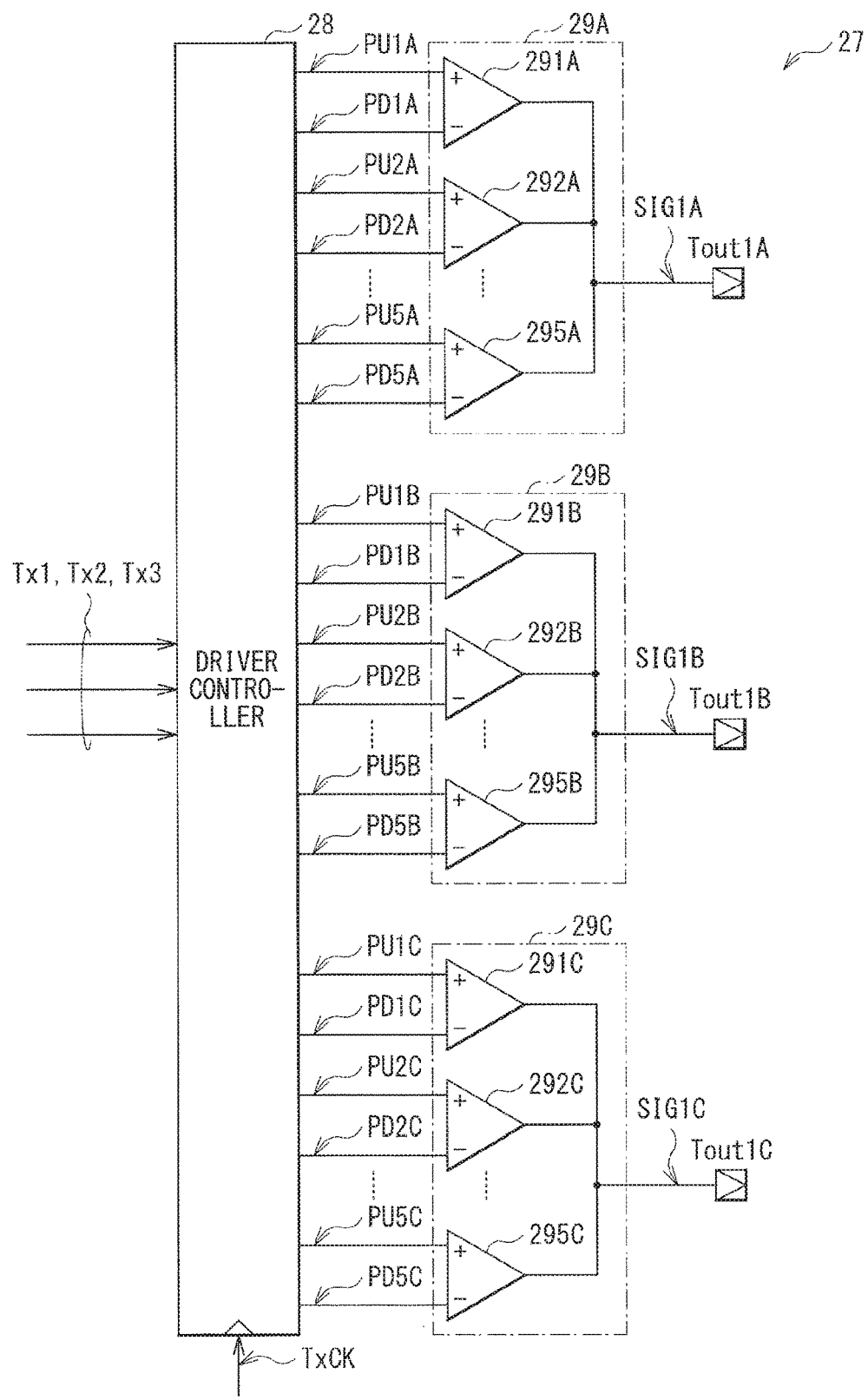

[FIG.9]
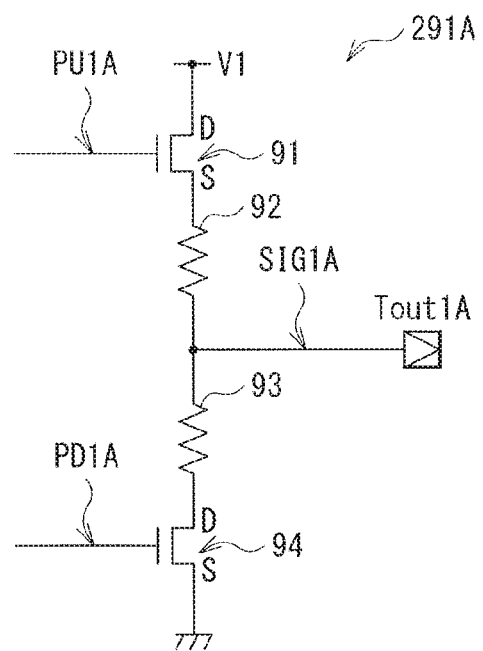

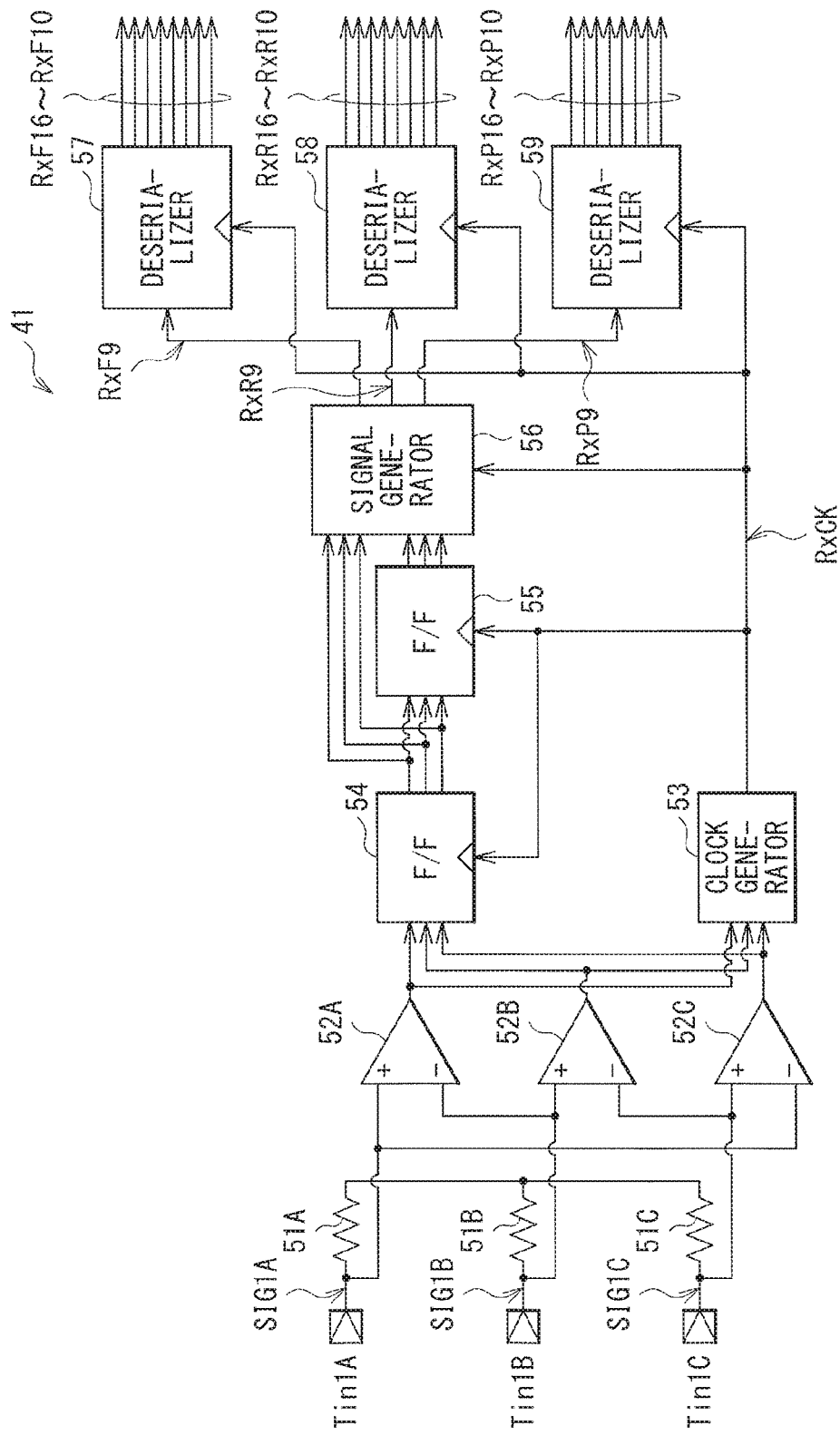
[ FIG. 10 ]

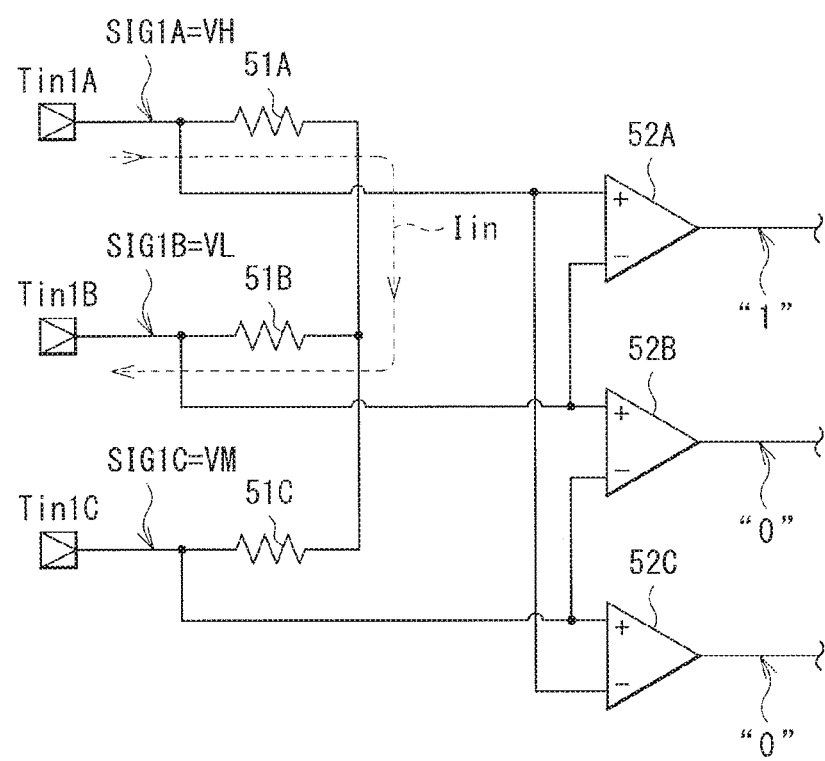
[FIG. 11]

[FIG. 12]
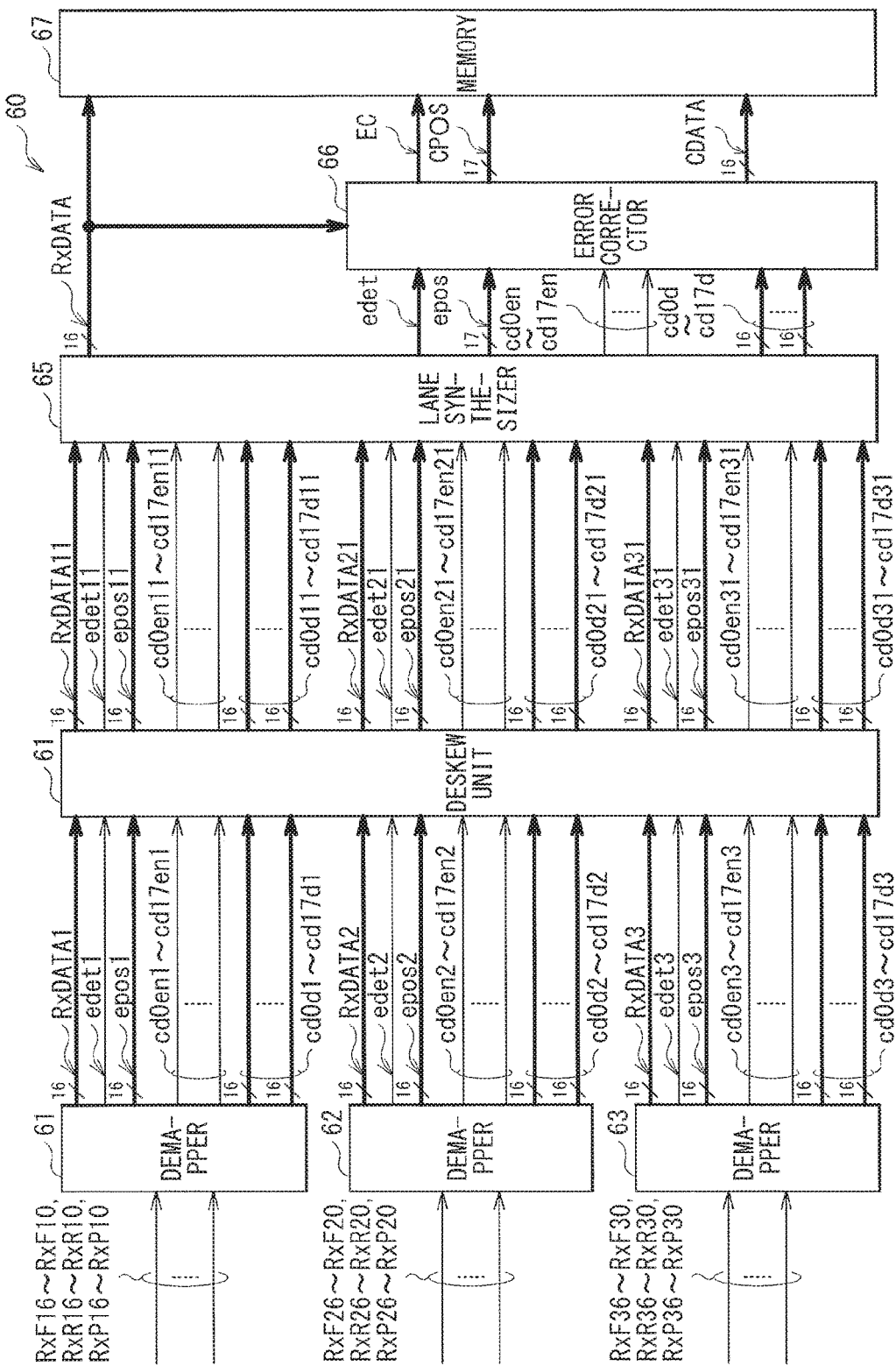

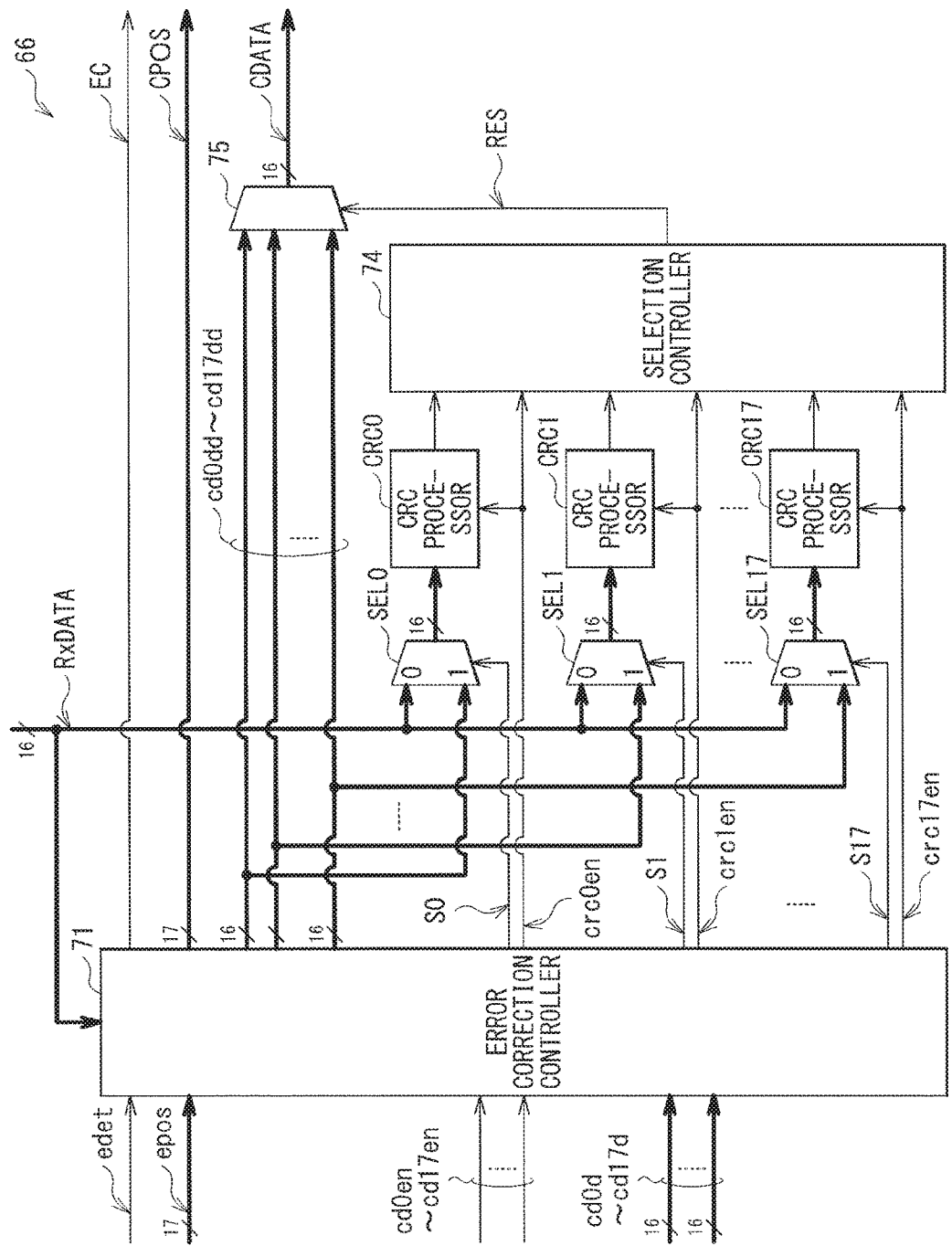
[ FIG. 13 ]

[FIG. 14]
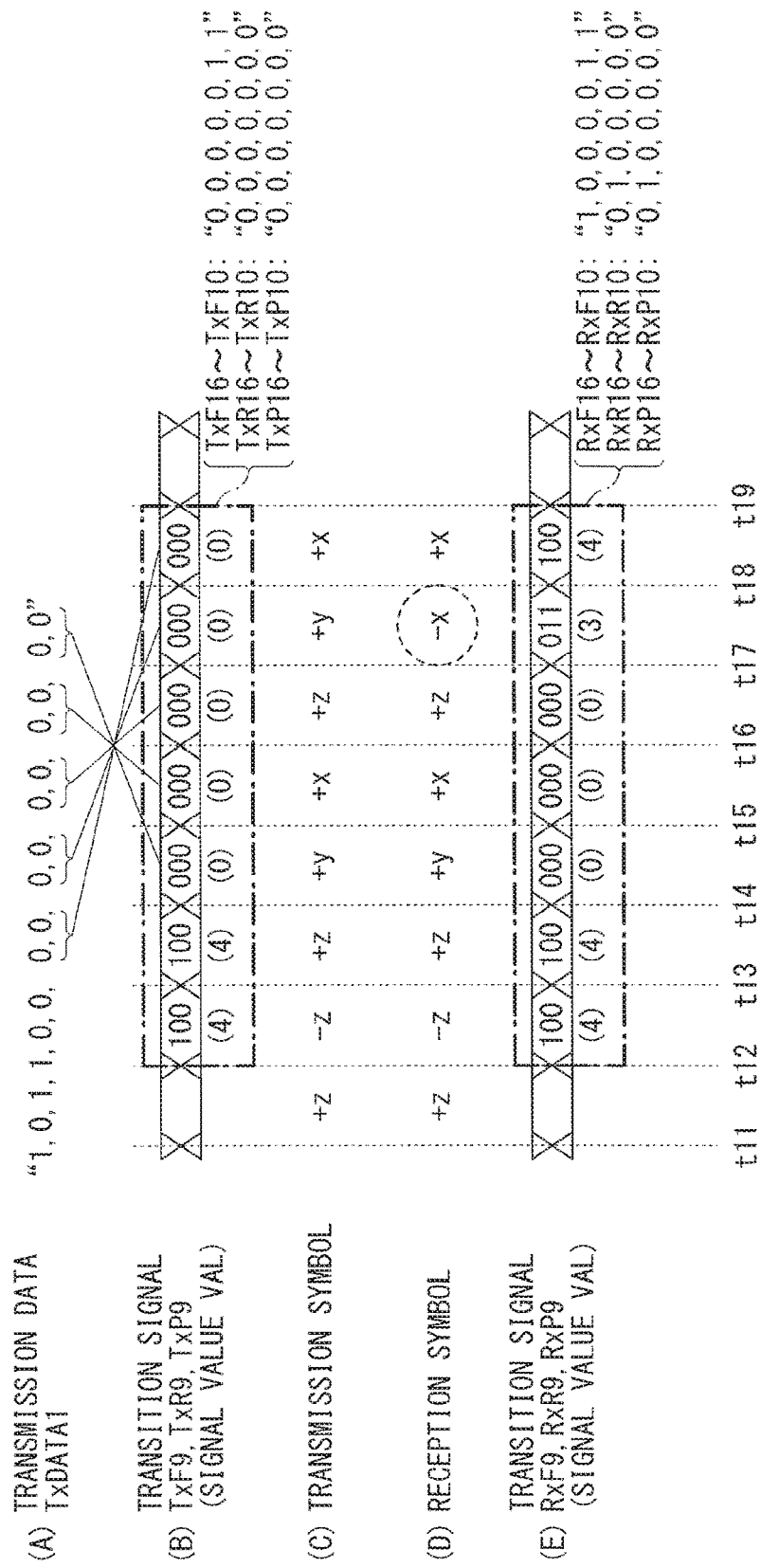

[ FIG. 15 ]

| RECEPTION SYMBOL | SIGNAL VALUE VAL | CANDIDATE DATA |
|---|---|---|
| (+z), (+x), +y, +z, +x, +z, -x, +x | 2, 0, 0, 0, 0, 3, 4 | cd0d1 = 1, 0, 1, 0, 1, 1, 0, 0, 0, 0, 0, 1, 0 |
| (+z), (-x), +y, +z, +x, +z, -x, +x | 3, 1, 0, 0, 0, 3, 4 | cd1d1 = 1, 0, 1, 0, 1, 1, 0, 0, 0, 0, 1, 1, 1 |
| (+z), (+y), +z, +y, +x, +z, -x, +x | 0, 2, 0, 0, 0, 3, 4 | cd2d1 = 1, 0, 1, 0, 1, 1, 0, 0, 0, 1, 0, 0, 0 |
| (+z), (-y), +z, +y, +x, +z, -x, +x | 1, 3, 0, 0, 0, 3, 4 | cd3d1 = 1, 0, 1, 0, 1, 1, 0, 0, 0, 1, 1, 0, 1 |
| (+z), -z, (+x), +y, +x, +z, -x, +x | 4, 3, 2, 0, 0, 3, 4 | cd4d1 = 1, 1, 0, 0, 0, 1, 1, 1, 0, 0, 0, 1, 1 |
| (+z), -z, (-x), +y, +x, +z, -x, +x | 4, 2, 3, 0, 0, 3, 4 | cd5d1 = 1, 1, 0, 0, 0, 1, 1, 1, 0, 0, 0, 1, 1, 0 |
| (+z), -z, +y, +x, +z, -x, +x | 4, 4, 0, 0, 0, 0, 0 | cd6d1 = 1, 0, 1, 1, 0, 0, 0, 0, 0, 0, 0, 0, 0 |
| (+z), -z, +y, +x, +z, -x, +x | 4, 4, 0, 0, 1, 1 | cd7d1 = 1, 0, 1, 1, 0, 0, 0, 1, 0, 0, 0, 0, 0 |
| (+z), -z, +y, (-y), +x, +z, -x, +x | 4, 4, 0, 0, 0, 3, 3 | cd8d1 = 1, 0, 1, 1, 1, 0, 0, 1, 1, 1, 0, 0, 0, 0 |
| (+z), -z, +y, (-y), +x, +z, -x, +x | 4, 4, 0, 0, 0, 3, 2 | cd9d1 = 1, 0, 1, 1, 1, 0, 0, 1, 0, 1, 0, 0, 0, 0 |
| (+z), -z, +y, +x, +z, (+z), -x, +x | 4, 4, 0, 0, 0, 3, 1 | cd10d1 = 1, 0, 1, 1, 0, 0, 0, 1, 1, 1, 0, 0, 0, 0 |
| (+z), -z, +y, +x, +z, (-z), -x, +x | 4, 4, 0, 0, 0, 3, 0 | cd11d1 = 1, 0, 1, 1, 0, 0, 0, 1, 1, 0, 0, 0, 0, 0 |

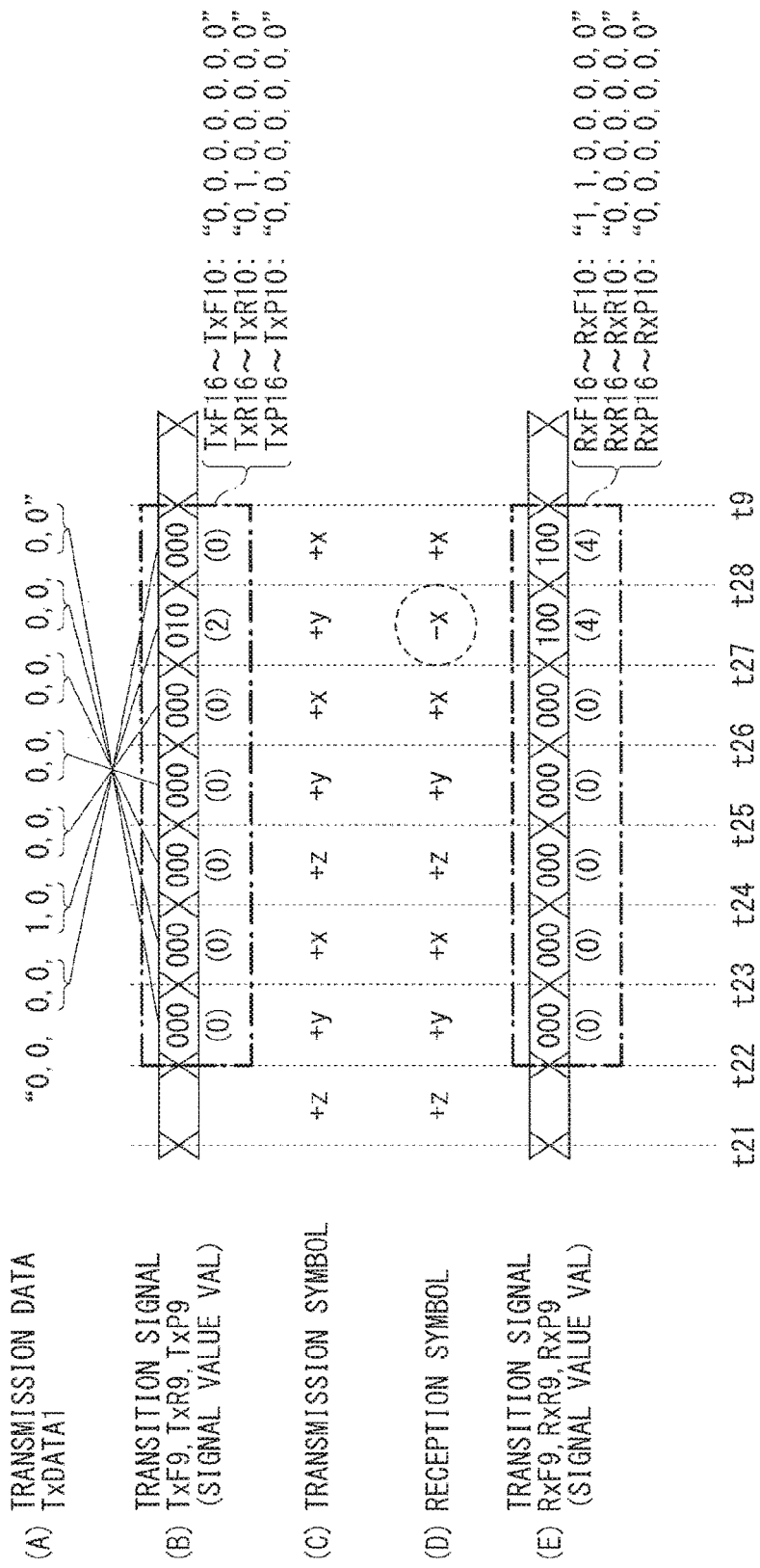
[FIG. 16]

[ FIG. 17 ]

| RECEPTION SYMBOL | SIGNAL VALUE VAL | CANDIDATE DATA |
|---|---|---|
| (+z), +y, +x, +z, +y, +y, (-y), -x, +x | 0, 0, 0, 0, 4, 0, 4 | cd0d1 = 1, 1, 1, 1, 1, 0, 0, 0, 0, 0, 0, 0, 0, 0, 0, 0 |
| (+z), +y, +x, +z, +y, +y, (+z), -x, +x | 0, 0, 0, 0, 2, 3, 4 | cd1d1 = 1, 0, 1, 0, 1, 1, 1, 0, 0, 0, 0, 0, 0, 0, 0, 0 |
| (+z), +y, +x, +z, +y, +y, (-z), -x, +x | 0, 0, 0, 0, 3, 2, 4 | cd2d1 = 1, 0, 1, 0, 1, 0, 1, 1, 0, 0, 0, 0, 0, 0, 0, 0 |
| (+z), +y, +x, +z, +y, +x, (+y), +x | 0, 0, 0, 0, 0, 2, 0 | cd3d1 = 0, 0, 0, 0, 1, 0, 0, 0, 0, 0, 0, 0, 0, 0, 0, 0 |
| (+z), +y, +x, +z, +y, +x, (-y), +x | 0, 0, 0, 0, 0, 3, 1 | cd4d1 = 0, 0, 0, 1, 1, 1, 0, 0, 0, 0, 0, 0, 0, 0, 0, 0 |
| (+z), +y, +x, +z, +y, +x, (+z), +x | 0, 0, 0, 0, 0, 0, 2 | cd5d1 = 0, 0, 1, 0, 0, 0, 0, 0, 0, 0, 0, 0, 0, 0, 0, 0 |
| (+z), +y, +x, +z, +y, +x, (-z), +x | 0, 0, 0, 0, 0, 1, 3 | cd6d1 = 0, 0, 1, 1, 0, 1, 0, 0, 0, 0, 0, 0, 0, 0, 0, 0 |
| (+z), +y, +x, +z, +y, +x, -x, (+y) | 0, 0, 0, 0, 0, 4, 3 | cd7d1 = 1, 0, 0, 1, 1, 1, 0, 0, 0, 0, 0, 0, 0, 0, 0, 0 |
| (+z), +y, +x, +z, +y, +x, -x, (-y) | 0, 0, 0, 0, 0, 4, 2 | cd8d1 = 1, 0, 0, 1, 1, 0, 0, 0, 0, 0, 0, 0, 0, 0, 0, 0 |
| (+z), +y, +x, +z, +y, +x, -x, (+z) | 0, 0, 0, 0, 0, 4, 1 | cd9d1 = 1, 0, 0, 1, 0, 1, 0, 0, 0, 0, 0, 0, 0, 0, 0, 0 |
| (+z), +y, +x, +z, +y, +x, -x, (-z) | 0, 0, 0, 0, 0, 4, 0 | cd10d1 = 1, 0, 0, 1, 0, 0, 0, 0, 0, 0, 0, 0, 0, 0, 0, 0 |

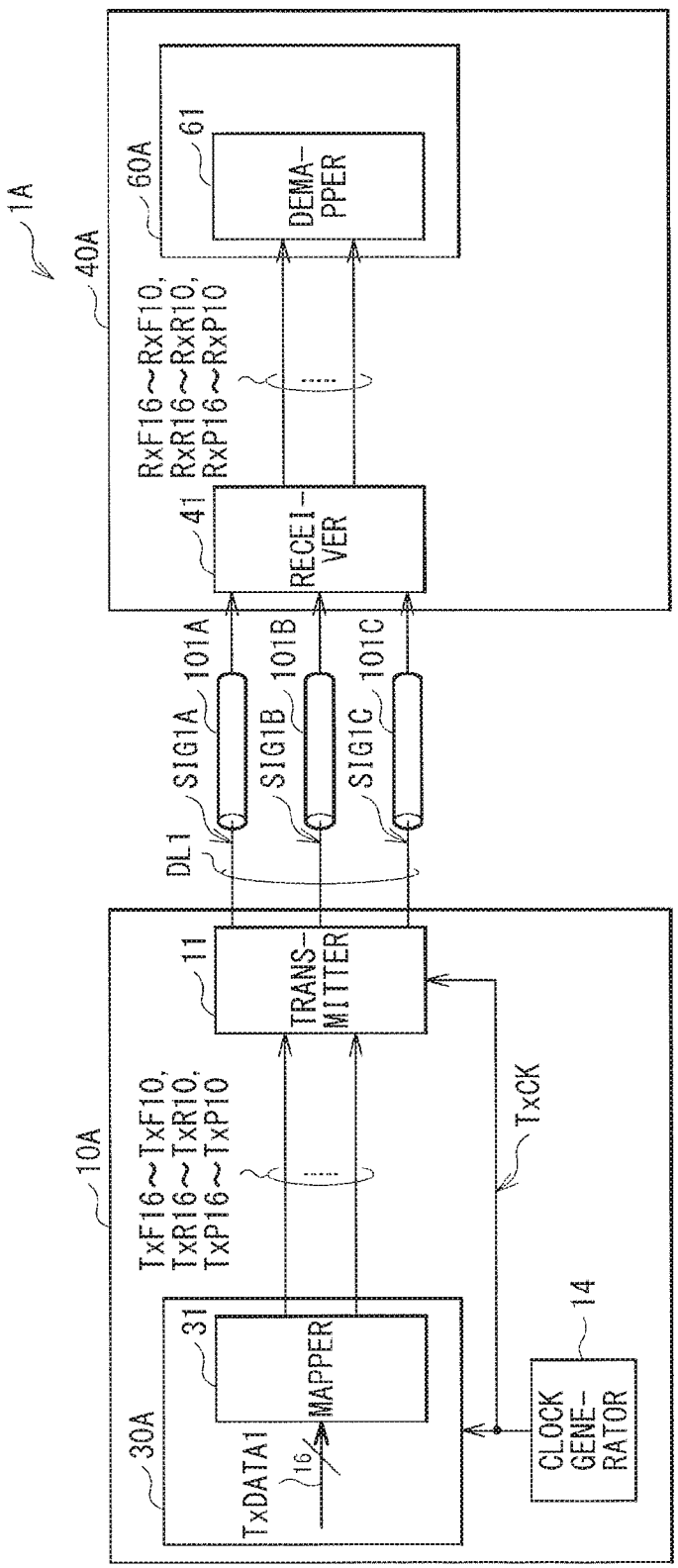
[ FIG. 18 ]

[ FIG. 19 ]
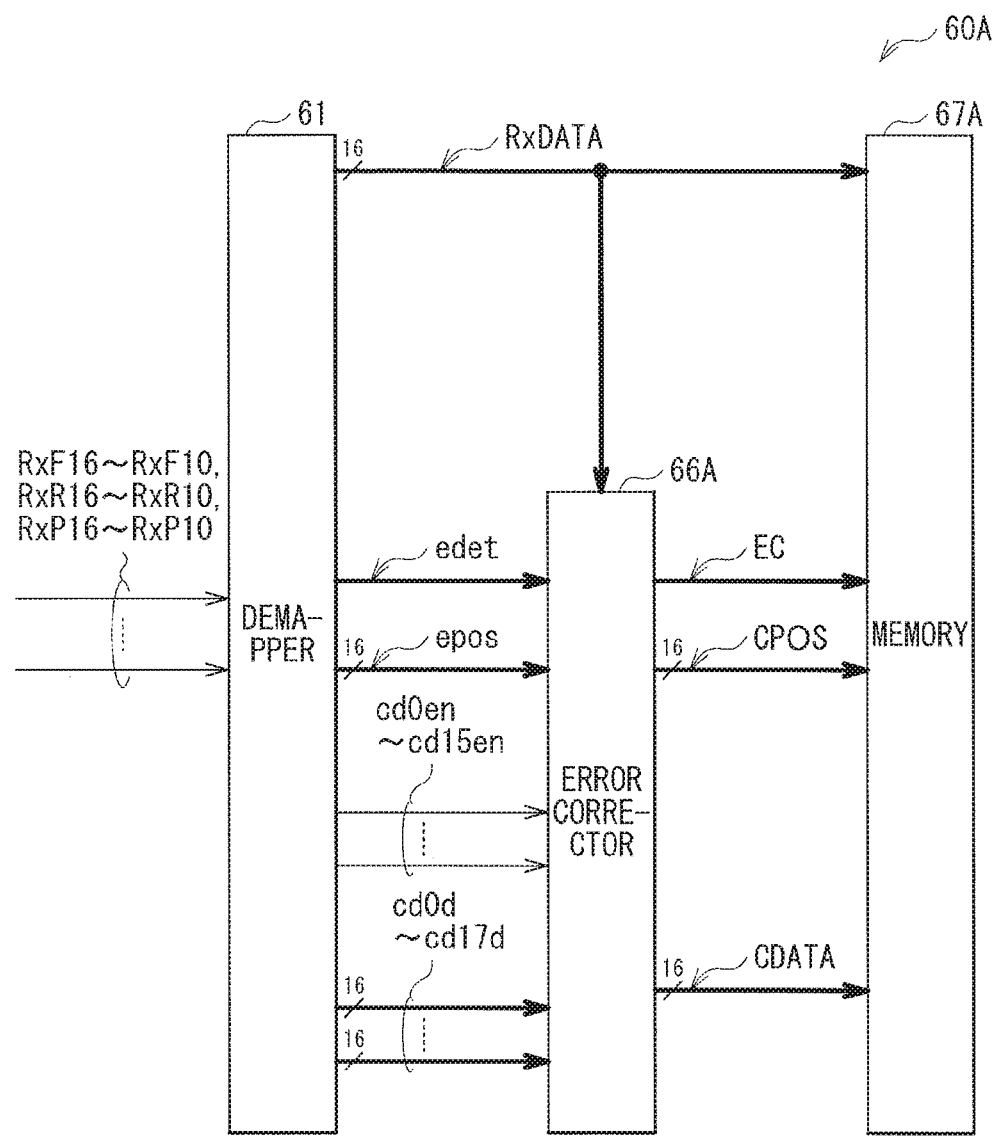

[ FIG. 20 ]
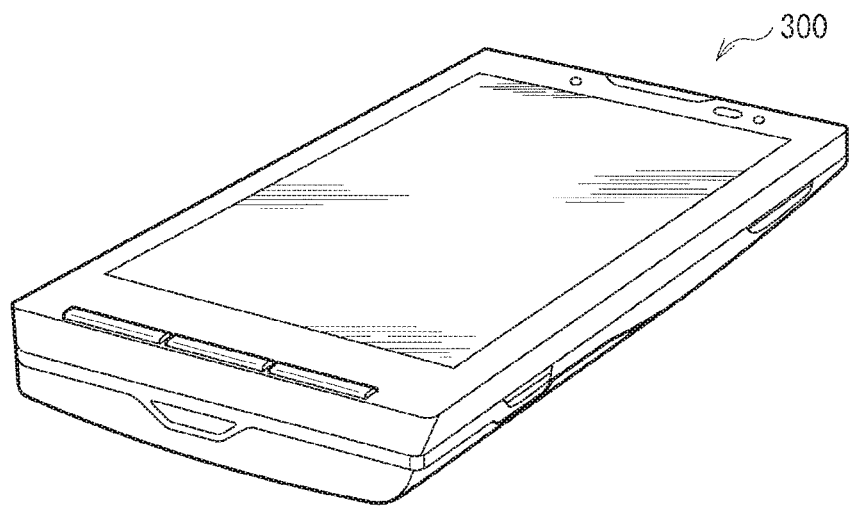

[ FIG. 21 ]
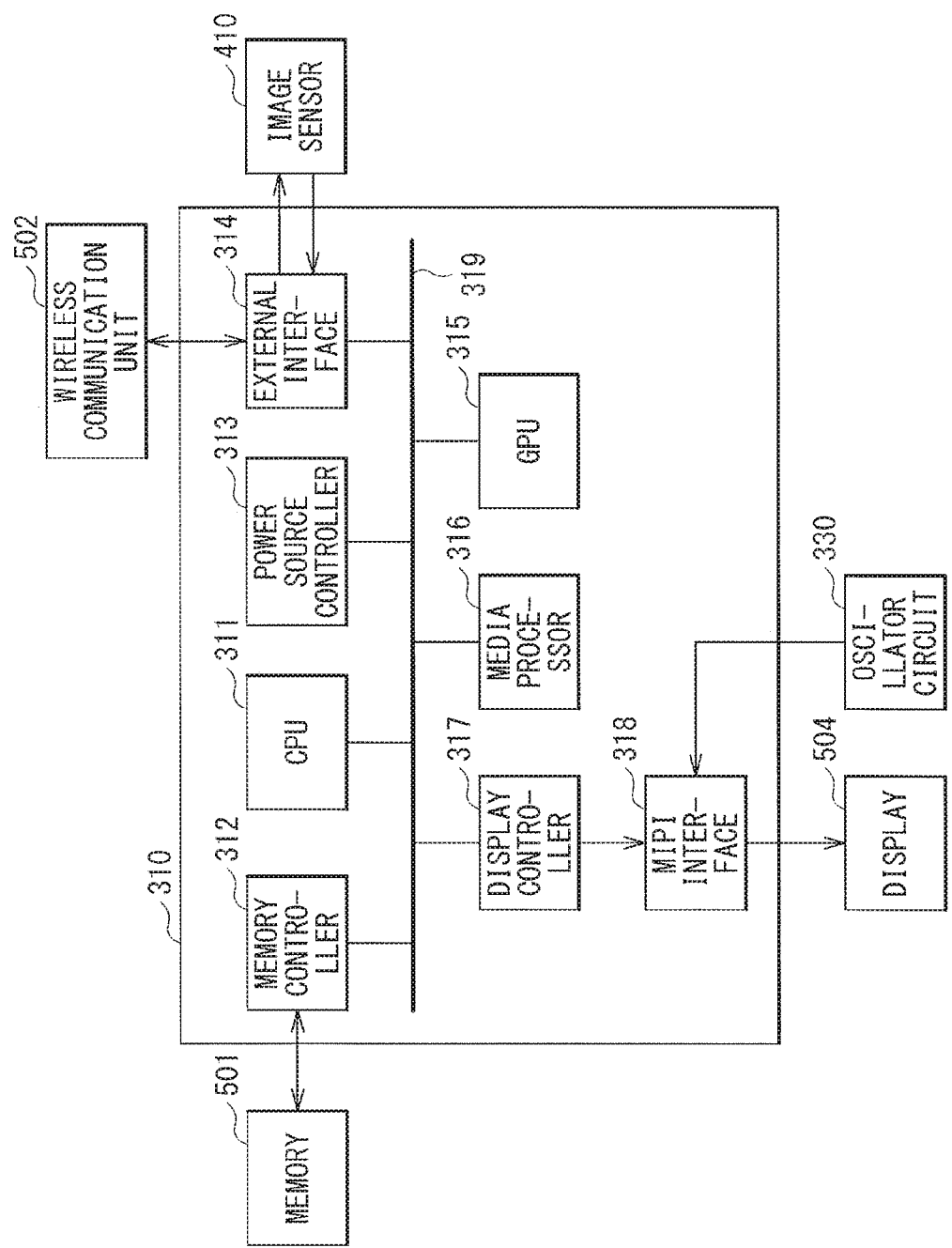

[FIG. 22]
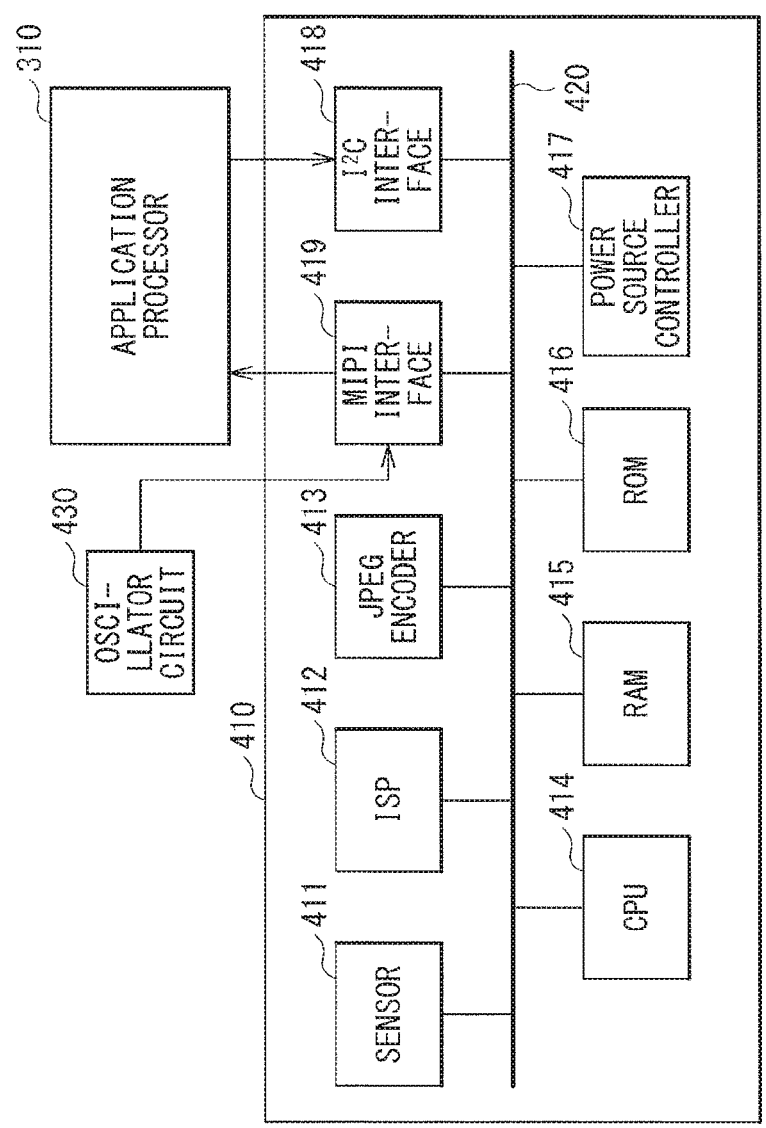

RECEPTION DEVICE, RECEPTION METHOD, AND COMMUNICATION SYSTEM

TECHNICAL FIELD

The present disclosure relates to a reception device that receives a signal, a reception method used in such a reception device, and a communication system including such a reception device.

BACKGROUND ART

In association with high functionality and multi-functionality of electronic apparatuses in recent years, the electronic apparatuses include various devices such as a semiconductor chip, a sensor, and a display device. A lot of pieces of data are exchanged between these devices, and the amount of such data has been increased with high functionality and multi-functionality of the electronic apparatuses. Accordingly, the data are frequently exchanged with use of a high-speed interface that allows for transmission and reception of data at several Gbps, for example.

In such a communication system, error detection and error correction are frequently used in order to enhance communication quality. For example, PTL 1 discloses a technology to enhance communication quality in a reception device that performs 10B8B conversion.

CITATION LIST

Patent Literature

PTL 1: Japanese Unexamined Patent Application Publication No. 2013-123087

SUMMARY OF THE INVENTION

As described above, in the communication system, high communication quality is desired, and a further improvement in communication quality is expected.

It is desirable to provide a reception device, a reception method, and a communication system that allow for enhancement of communication quality.

A reception device according to an embodiment of the present disclosure includes a receiver, a transition signal generator, and a converter. The receiver generates a symbol signal indicating a sequence of symbols on the basis of a plurality of transmission signals. The transition signal generator generates a transition signal indicating a sequence of symbol transitions on the basis of the symbol signal. The converter repeats an operation of converting transition data including a predetermined number of the symbol transitions into reception data to convert the sequence of the symbol transitions into a sequence of reception data, and generates, in a case where the sequence of the symbol transitions includes first transition data that is not convertible into the reception data, candidate data as a candidate of the reception data on the basis of the first transition data.

A reception method according to an embodiment of the present disclosure includes: generating a symbol signal indicating a sequence of symbols on the basis of a plurality of transmission signals; generating a transition signal indicating a sequence of symbol transitions on the basis of the symbol signal; repeating an operation of converting transition data including a predetermined number of the symbol transitions into reception data to convert the sequence of the symbol transitions into a sequence of reception data; and generating, in a case where the sequence of the symbol transitions includes first transition data that is not convertible into the reception data, candidate data as a candidate of the reception data on the basis of the first transition data.

A communication system according to an embodiment of the present disclosure includes: a transmission device and a reception device. The transmission device transmits a plurality of transmission signals. The reception device receives the plurality of transmission signals. The above-described reception device includes a receiver, a transition signal generator, and a converter. The receiver generates a symbol signal indicating a sequence of symbols on the basis of a plurality of transmission signals. The transition signal generator generates a transition signal indicating a sequence of symbol transitions on the basis of the symbol signal. The converter repeats an operation of converting transition data including a predetermined number of the symbol transitions into reception data to convert the sequence of the symbol transitions into a sequence of reception data, and generates, in a case where the sequence of the symbol transitions includes first transition data that is not convertible into the reception data, candidate data as a candidate of the reception data on the basis of the first transition data.

In the reception device, the reception method, and the communication system according to the embodiments of the present disclosure, the symbol signal is generated on the basis of the plurality of transmission signals, and the transition signal is generated on the basis of the symbol signal. Thereafter, the sequence of the symbol transitions included in the transition signal is converted into the sequence of the reception data. In this conversion operation, the operation of converting the transition data including the predetermined number of the symbol transitions into the reception data is repeated. At this occasion, in a case where the sequence of the symbol transitions includes the first transition data that is not convertible into the reception data, candidate data as a candidate of the reception data is generated on the basis of the first transition data.

According to the reception device, the reception method, and the communication system of the embodiments of the present disclosure, in a case where the sequence of the symbol transitions includes the first transition data that is not convertible into the reception data upon conversion of the sequence of the symbol transitions into the sequence of the reception data, the candidate data is generated on the basis of the first transition data, which makes it possible to enhance communication quality. It is to be noted that an effect described above is not necessarily limited, and any of effects described in the present disclosure may be included.

BRIEF DESCRIPTION OF THE DRAWINGS

FIG. 1 is a block diagram illustrating a configuration example of a communication system according to an embodiment of the present disclosure.

FIG. 2 is an explanatory diagram illustrating a configuration of a packet to be transmitted and received by the communication system illustrated in FIG. 1.

FIG. 3 is an explanatory diagram illustrating voltage states of signals to be transmitted and received by the communication system illustrated in FIG. 1.

FIG. 4 is an explanatory diagram illustrating transition of a symbol to be transmitted and received by the communication system illustrated in FIG. 1.

FIG. 5 is a table illustrating an example of a mapping operation and a demapping operation.

FIG. 6 is a block diagram illustrating a configuration example of a transmitter illustrated in FIG. 1.

FIG. 7 is a table illustrating an operation example of an output unit illustrated in FIG. 6.

FIG. 8 is a block diagram illustrating a configuration example of the output unit illustrated in FIG. 6.

FIG. 9 is a circuit diagram illustrating a configuration example of a driver illustrated in FIG. 8.

FIG. 10 is a block diagram illustrating a configuration example of a receiver illustrated in FIG. 1.

FIG. 11 is an explanatory diagram illustrating a reception operation of the receiver illustrated in FIG. 10.

FIG. 12 is a block diagram illustrating a configuration example of a processor illustrated in FIG. 1.

FIG. 13 is a block diagram illustrating a configuration example of an error corrector illustrated in FIG. 12.

FIG. 14 is a timing chart illustrating an operation example of the communication system illustrated in FIG. 1.

FIG. 15 is a table illustrating an operation example of a demapper illustrated in FIG. 12.

FIG. 16 is a timing chart illustrating another operation example of the communication system illustrated in FIG. 1.

FIG. 17 is a table illustrating another operation example of the demapper illustrated in FIG. 12.

FIG. 18 is a block diagram illustrating a configuration example of a communication system according to a modification example.

FIG. 19 is a block diagram illustrating a configuration example of a processor illustrated in FIG. 18.

FIG. 20 is a perspective view of an external appearance configuration of a smartphone to which the communication system according to the embodiment is applied.

FIG. 21 is a block diagram illustrating a configuration example of an application processor to which the communication system according to the embodiment is applied.

FIG. 22 is a block diagram illustrating a configuration example of an image sensor to which the communication system according to the embodiment is applied.

MODES FOR CARRYING OUT THE INVENTION

Some embodiments of the present disclosure are described in detail below with reference to the drawings. It is to be noted that description is given in the following order.
1. Embodiment
2. Application Examples 1. Embodiment Configuration Example FIG. 1 illustrates a configuration example of a communication system (a communication system 1) according to an embodiment. It is to be noted that a reception method according to an embodiment of the present disclosure is embodied by the present embodiment, and is therefore described therewith.

The communication system 1 includes a transmission device 10 and a reception device 40. The transmission device 10 transmits data to the reception device 40 through three data lanes DL1 to DL3, and the reception device 40 receives data transmitted from the transmission device 10 through the three data lanes DL1 to DL3. At this occasion, the communication system 1 performs data exchange with use of a packet PCT through each of the data lanes DL1 to DL3.

FIG. 2 illustrates a configuration example of the packet PCT. The packet PCT includes a SoT (Start of Transmission) P1, a header P2, a payload P3, a footer P4, and an EoT (End of Transmission) P5.

The SoT P1 defines a start of the packet PCT.

The header P2 includes, for example, a block count P21. The block count P21 indicates a number N of data blocks (to be described later) in the payload P3. It is to be noted that the header P2 may further include a code for error checking in the header P2. Specifically, it is possible for the header P2 to include, for example, a cyclic redundancy check (CRC) code.

The payload P3 includes a body of data to be transmitted. The payload P3 includes the number N of data blocks DB(1) to DB(N). Each of the data blocks DB(1) to DB(N) is 16-bit data in this example.

The footer P4 includes, for example, an error detection code P41, and a filler P42. The error detection code P41 is a code for error checking in the payload P3, and is a cyclic redundancy check code in this example. The filler P42 adjusts a difference in data amount among the data lanes DL1, DL2, and DL3, and is inserted in a data lane unit on an as-needed basis.

The EoT P5 defines an end of the packet PCT.

The communication system 1 performs data exchange with use of such a packet PCT through each of the data lanes DL1 to DL3. At this occasion, the communication system 1 uses signals SIG1A, SIG1B, and SIG1C in the data lane DL1, uses signals SIG2A, SIG2B, and SIG2C in the data lane DL2, and uses signals SIG3A, SIG3B, and SIG3C in the data lane DL3, thereby performing exchange of the packet PCT through respective data lanes. Characteristic impedances of transmission paths 101A to 101C, 102A to 102C, and 103A to 103C through which these signals are transmitted are 50|Ω| in this example.

The signals SIG1A to SIG1C each make a transition involving three voltage levels (i.e., a high-level voltage VH, a medium-level voltage VM, and a low-level voltage VL). Likewise, the signals SIG2A to SIG2C each make a transition involving the three voltage levels, and the signals SIG3A to SIG3C each make a transition involving the three voltage levels.

FIG. 3 illustrates the voltage levels of the signals SIG1A, SIG1B, and SIG1C. It is to be noted that this also applies to the signals SIG2A to SIG2C and the signals SIG3A to SIG3C. The transmission device 10 uses the three signals SIG1A, SIG1B, and SIG1C to transmit six symbols "+x", "−x", "+y", "−y", "+z", and "−z". For example, in a case where the transmission device 10 transmits the symbol "+x", the transmission device 10 respectively sets the signal SIG1A, the signal SIG1B, and the signal SIG1C to the high-level voltage VH, the low-level voltage VL, and the medium-level voltage VM. In a case where the transmission device 10 transmits the symbol "−x", the transmission device 10 respectively sets the signal SIG1A, the signal SIG1B, and the signal SIG1C to the low-level voltage VL, the high-level voltage VH, and the medium-level voltage VM. In a case where the transmission device 10 transmits the symbol "+y", the transmission device 10 respectively sets the signal SIG1A, the signal SIG1B, and the signal SIG1C to the medium-level voltage VM, the high-level voltage VH, and the low-level voltage VL. In a case where the transmission device 10 transmits the symbol "−y", the transmission device 10 respectively sets the signal SIG1A, the signal SIG1B, and the signal SIG1C to the medium-level voltage VM, the low-level voltage VL, and the high-level voltage VH. In a case where the transmission device 10 transmits the symbol "+z", the transmission device 10 respectively sets the signal SIG1A, the signal SIG1B, and the signal SIG1C to the low-level voltage VL, the medium-level voltage VM, and the high-level voltage VH. In a case where the transmission device 10 transmits the symbol "−z", the transmission device 10 respectively sets the signal SIG1A, the signal SIG1B, and the signal SIG1C to the high-level voltage VH, the medium-level voltage VM, and the low-level voltage VL.

(Transmission Device 10)

The transmission device 10 includes a clock generator 14, a processor 30, and three transmitters 11 to 13.

The clock generator 14 generates a clock signal TxCK. The clock generator 14 uses, for example, a PLL (Phase Locked Loop), and generates the clock signal TxCK on the basis of, for example, a reference clock (not illustrated) supplied from outside of the transmission device 10. Thereafter, the clock generator 14 supplies the clock signal TxCK to the processor 30 and the transmitters 11 to 13.

The processor 30 performs predetermined processing to generate transition signals TxF16 to TxF10, TxR16 to TxR10, and TxP16 to TxP10, transition signals TxF26 to TxF20, TxR26 to TxR20, and TxP26 to TxP20, and transition signals TxF36 to TxF30, TxR36 to TxR30, and TxP36 to TxP30.

A group of the transmission signals TxF16, TxR16, and TxP16 of the transition signals TxF16 to TxF10, TxR16 to TxR10, and TxP16 to TxP10 indicates a symbol transition in a sequence of symbols that is to be transmitted by the transmission device 10 through the data lane DL1. Likewise, a group of the transition signals TxF15, TxR15, and TxP15 indicates a symbol transition, a group of the transition signals TxF14, TxR14, and TxP14 indicate a symbol transition, a group of transition signals TxF13, TxR13, and TxP13 indicates a symbol transition, a group of the transition signals TxF12, TxR12, and TxP12 indicates a symbol transition, a group of the transition signals TxF11, TxR11, and TxP11 indicates a symbol transition, and a group of the transition signals TxF10, TxR10, and TxP10 indicates a symbol transition. In other words, the transition signals TxF16 to TxF10, TxR16 to TxR10, and TxP16 to TxP10 include seven groups of transition signals. Likewise, the transition signals TxF26 to TxF20, TxR26 to TxR20, and TxP26 to TxP20 include seven groups of transition signals, and the transition signals TxF36 to TxF30, TxR36 to TxR30, and TxP36 to TxP30 include seven groups of transition signals.

Hereinafter, on an as-needed basis, transition signals TxF, TxR, and TxP are used as indication of any group of the transition signals TxF16 to TxF10, TxF26 to TxF20, TxF36 to TxF30, TxR16 to TxR10, TxR26 to TxR20, TxR36 to TxR30, TxP16 to TxP10, TxP26 to TxP20, and TxP36 to TxP30.

FIG. 4 illustrates a relationship between the transition signals TxF, TxR, and TxP and symbol transition. Numerical values of three digits given to each transition indicate signal values of the transition signals TxF, TxR, and TxP in this order. A value in parentheses indicates a decimal value (a signal value VAL) of the numeral values of three digits.

The transition signal TxF (Flip) causes a symbol transition between "+x" and "−x", a symbol transition between "+y" and "−y", and a symbol transition between "+z" and "−z". Specifically, in a case where the transition signal TxF is "1", a transition is made to change the polarity of the symbol (for example, from "+x" to "−x"), and in a case where the transition signal TxF is "0", such a transition is not made.

The transition signals TxR (Rotation) and TxP (Polarity) cause symbol transitions between "+x" and a symbol other than "−x", between "+y" and a symbol other than "−y", and between "+z" and a symbol other than "−z". Specifically, in a case where the transition signals TxR and TxP are respectively "1" and "0", a transition is made in a clockwise direction in FIG. 4 while keeping the polarity of the symbol (for example, from "+x" to "+y"), and in a case where the signals TxR and TxP are respectively "1" and "1", a transition is made in the clockwise direction in FIG. 4 while changing the polarity of the symbol (for example, from "+x" to "−y"). Moreover, in a case where the transition signals TxR and TxP are respectively "0" and "0", a transition is made in a counterclockwise direction in FIG. 4 while keeping the polarity of the symbol (for example, from "+x" to "+z"), and in a case where the transition signals TxR and TxP are respectively "0" and "1", a transition is made in the counterclockwise direction in FIG. 4 while changing the polarity of the symbol (for example, from "+x" to "−z").

The processor 30 includes mappers 31, 32, and 33.

The mapper 31 performs a mapping process on the basis of 16-bit transmission data TxDATA1 to generate seven groups of the transition signals TxF, TxR, and TxP (the transition signals TxF16 to TxF10, TxR16 to TxR10, and TxP16 to TxP10). Herein, the 16-bit transmission data TxDATA1 corresponds to one data block in the packet PCT illustrated in FIG. 2. The mapper 31 has, for example, a conversion table for conversion of the 16-bit transmission data TxDATA1 into seven groups of the transition signals TxF, TxR, and TxP, and generates the seven groups of the transition signals TxF, TxR, and TxP with use of the conversion table.

Likewise, the mapper 32 performs a mapping process on the basis of 16-bit transmission data TxDATA2 to generate seven groups of the transition signals TxF, TxR, and TxP (the transition signals TxF26 to TxF20, TxR26 to TxR20, and TxP26 to TxP20). Moreover, the mapper 33 performs a mapping process on the basis of 16-bit transmission data TxDATA3 to generate seven groups of the transition signals TxF, TxR, and TxP (the transition signals TxF36 to TxF30, TxR36 to TxR30, and TxP36 to TxP30).

FIG. 5 illustrates an example of the mapping process in the mapper 31. It is to be noted that this also applies to the mappers 32 and 33. In FIG. 5, "ro6" to "ro0" respectively indicate signal values of the transition signals TxR16 to TxR10, and "po6" to "po0" respectively indicate signal values of the transition signals TxP16 to TxP10.

For example, in a case where the 16-bit transmission data TxDATA1 is "1, 1, 1, 1, 1, 1, ro5, po5, ro3, po3, ro2, po2, ro1, po1, ro0, po0", the mapper 31 sets the transition signals TxF16 to TxF10 to "1, 0, 1, 0, 0, 0, 0", sets the transition signals TxR16 to TxR10 to "0, ro5, 0, ro3, ro2, ro1, ro0", and sets the transition signals TxP16 to TxP10 to "0, po5, 0, po3, po2, po1, po0". Moreover, for example, in a case where the transmission data TxDATA1 is "1, 1, 1, 1, 1, 0, ro6, po6, ro3, po3, ro2, po2, ro1, po1, ro0, po0", the mapper 31 sets the transition signal TxF16 to TxF10 to "0, 1, 1, 0, 0, 0, 0", sets the transition signals TxR16 to TxR10 to "ro6, 0, 0, ro3, ro2, ro1, ro0", and sets the transition signals TxP16 to TxP10 to "po6, 0, 0, po3, po2, po1, po0".

The mapper 31 generates seven groups of the transition signals TxF, TxR, and TxP (the transition signals TxF16 to TxF10, TxR16 to TxR10, and TxP16 to TxP10) on the basis of the 16-bit transmission data TxDATA1 in such a manner. Thereafter, the mapper 31 supplies the generated seven groups of the transition signals TxF, TxR, and TxP to the transmitter 11.

Likewise, the mapper 32 generates seven groups of the transition signals TxF, TxR, and TxP (the transition signals TxF26 to TxF20, TxR26 to TxR20, and TxP26 to TxP20) on the basis of the 16-bit transmission data TxDATA2, and supplies the seven groups of the transition signals TxF, TxR, and TxP to the transmitter 12. Moreover, the mapper 33 generates seven groups of the transmission signals TxF, TxR, and TxP (the transition signals TxF36 to TxF30, TxR36 to TxR30, and TxP36 to TxP30) on the basis of the 16-bit transmission data TxDATA3, and supplies the seven groups of the transition signals TxF, TxR, and TxP to the transmitter 13.

The transmitter 11 (FIG. 1) generates the signals SIG1A, SIG1B, and SIG1C on the basis of the transition signals TxF16 to TxF10, TxR16 to TxR10, and TxP16 to TxP10. The transmitter 12 generates the signals SIG2A, SIG2B, and SIG2C on the basis of the transition signals TxF26 to TxF20, TxR26 to TxR20, and TxP26 to TxP20. The transmitter 13 generates the signals SIG3A, SIG3B, and SIG3C on the basis of the transition signals TxF36 to TxF30, TxR36 to TxR30, and TxP36 to TxP30.

FIG. 6 illustrates a configuration example of the transmitter 11. It is to be noted that this also applies to the transmitters 12 and 13. The transmitter 11 includes serializers 21 to 23, a transmission symbol generator 24, and an output unit 27.

The serializer 21 serializes the transition signals TxF10, TxF11, TxF12, TxF13, TxF14, TxF15, and TxF16 in this order on the basis of the transition signals TxF16 to TxF10 and the clock signal TxCK to generate a transition signal TxF9. The serializer 22 serializes the transition signals TxR10, TxR11, TxR12, TxR13, TxR14, TxR15, and TxR16 in this order on the basis of the transition signals TxR16 to TxR10 and the clock signal TxCK to generate a transition signal TxR9. The serializer 23 serializes the transition signals TxP10, TxP11, TxP12, TxP13, TxP14, TxP15, and TxP16 in this order on the basis of the transition signals TxP16 to TxP10 and the clock signal TxCK to generate a transition signal TxP9.

The transmission symbol generator 24 generates symbol signals Tx1, Tx2, and Tx3 on the basis of the transition signals TxF9, TxR9, and TxP9 and the clock signal TxCK. The transmission symbol generator 24 includes a signal generator 25 and a flip-flop 26.

The signal generator 25 generates the symbol signal Tx1, Tx2, and Tx3 on the basis of the transition signals TxF9, TxR9, and TxP9 and symbol signals D1, D2, and D3. Specifically, the signal generator 25 determines a symbol after a transition as illustrated in FIG. 4 on the basis of a symbol indicated by the symbol signals D1, D2, and D3 (a symbol before the transition) and the transition signals TxF9, TxR9, and TxP9, and outputs the symbol after the transition as the symbol signals Tx1, Tx2, and Tx3.

The flip-flop 26 samples the symbol signals Tx1, Tx2, and Tx3 on the basis of the clock signal TxCK and respectively outputs sampling results of the symbol signals Tx1, Tx2, and Tx3 as the symbol signals D1, D2, and D3.

The output unit 27 generates the signals SIG1A, SIG1B, and SIB1C on the basis of the symbol signals Tx1, Tx2, and Tx3, and the clock signal TxCK.

FIG. 7 illustrates an operation example of the output unit 27. For example, in a case in which the symbol signal Tx1, Tx2, and Tx3 are respectively "1", "0", and "0", the output unit 27 respectively sets the signal SIG1A, the signal SIG1B, and the signal SIG1C to the high-level voltage VH, the low-level voltage VL, and the medium-level voltage VM. In other words, the output unit 27 generates the symbol "+x". Moreover, for example, in a case in which the symbol signals Tx1, Tx2, and Tx3 are respectively "0", "1", and "1", the output unit 27 respectively sets the signal SIG1A, the signal SIG1B, and the signal SIG1C to the low-level voltage VL, the high-level voltage VH, and the medium-level voltage VM. In other words, the output unit 27 generates the symbol "−x". Further, for example, in a case in which the symbol signals Tx1, Tx2, and Tx3 are respectively "0", "1", and "0", the output unit 27 respectively sets the signal SIG1A, the signal SIG1B, and the signal SIG1C to the medium-level voltage VM, the high-level voltage VH, and the low-level voltage VL. In other words, the output unit 27 may generate the symbol "+y". Furthermore, for example, in a case in which the symbol signals Tx1, Tx2, and Tx3 are respectively "1", "0", and "1", the output unit 27 respectively sets the signal SIG1A, the signal SIG1B, and the signal SIG1C to the medium-level voltage VM, the low-level voltage VL, and the high-level voltage VH. In other words, the output unit 27 may generate the symbol "−y". Moreover, for example, in a case in which the symbol signal Tx1, Tx2, and Tx3 are respectively "0", "0", and "1", the output unit 27 respectively sets the signal SIG1A, the signal SIG1B, and the signal SIG1C to the low-level voltage VL, the medium-level voltage VM, and the high-level voltage VH. In other words, the output unit 27 generates the symbol "+z". Further, for example, in a case in which the symbol signal Tx1, Tx2, and Tx3 are respectively "1", "1", and "0", the output unit 27 respectively sets the signal SIG1A, the signal SIG1B, and the signal SIG1C to the high-level voltage VH, the medium-level voltage VM, and the low-level voltage VL. In other words, the output unit 27 generates the symbol "−z".

FIG. 8 illustrates a configuration example of the output unit 27. The output unit 27 includes a driver controller 28 and driver units 29A, 29B, and 29C.

The driver controller 28 generates control signals PU1A to PU5A, PD1A to PD5A, PU1B to PU5B, PD1B to PD5B, PU1C to PU5C, and PD1C to PD5C on the basis of the symbol signals Tx1, Tx2, and Tx3, and the clock signal TxCK. Thereafter, the driver controller 28 supplies the control signals PU1A to PU5A and PD1A to PD5A to the driver unit 29A, supplies the control signals PU1B to PU5B and PD1B to PD5B to the driver unit 29B, and supplies the control signals PU1C to PU5C and PD1C to PD5C to the driver unit 29C.

The driver unit 29A generates the signal SIG1A on the basis of the control signals PU1A to PU5A and PD1A to PD5A. In this example, the driver unit 29A includes five drivers 291A to 295A. The drivers 291A to 295A set a voltage of an output terminal Tout1A on the basis of signals supplied to positive input terminals thereof and signals supplied to negative input terminal thereof. The positive input terminal of the driver 291A is supplied with the control signal PU1A, the negative input terminal of the driver 291A is supplied with the control signal PD1A, and an output terminal of the driver 291A is coupled to the output terminal Tout1A of the transmission device 10. The positive input terminal of the driver 292A is supplied with the control signal PU2A, the negative input terminal of the driver 292A is supplied with the control signal PD2A, and an output terminal of the driver 292A is coupled to the output terminal Tout1A of the transmission device 10. The positive input terminal of the driver 293A is supplied with the control signal PU3A, the negative input terminal of the driver 293A is supplied with the control signal PD3A, and an output terminal of the driver 293A is coupled to the output terminal Tout1A of the transmission device 10. The positive input terminal of the driver 294A is supplied with the control signal PU4A, the negative input terminal of the driver 294A is supplied with the control signal PD4A, and an output terminal of the driver 294A is coupled to the output terminal Tout1A of the transmission device 10. The positive input terminal of the driver 295A is supplied with the control signal PU5A, the negative input terminal of the driver 295A is supplied with the control signal PD5A, and an output terminal of the driver 295A is coupled to the output terminal Tout1A of the transmission device 10. In such a manner, the output terminals of the drivers 291A to 295A are coupled to one another, and are coupled to the output terminal Tout1A.

The driver unit 29B generates the signal SIG1B on the basis of the control signals PU1B to PU5B and PD1B to PD5B. In this example, the driver unit 29B includes five drivers 291B to 295B. A positive input terminal of the driver 291B is supplied with the control signal PU1B, a negative input terminal of the driver 291B is supplied with the control signal PD1B, and an output terminal of the driver 291B is coupled to an output terminal Tout1B of the transmission device 10. This also applies to the drivers 292B to 295B. In such a manner, the output terminals of the drivers 291B to 295B are coupled to one another, and are coupled to the output terminal Tout1B.

The driver unit 29C generates the signal SIG1C on the basis of the control signals PU1C to PU5C and PD1C to PD5C. In this example, the driver unit 29C includes five drivers 291C to 295C. A positive input terminal of the driver 291C is supplied with the control signal PU1C, a negative input terminal of the driver 291C is supplied with the control signal PD1C, and an output terminal of the driver 291C is coupled to an output terminal Tout1C of the transmission device 10. This also applies to the drivers 292C to 295C. In such a manner, the output terminals of the drivers 291C to 295C are coupled to one another, and are coupled to the output terminal Tout1C.

FIG. 9 illustrates a configuration example of the driver 291A. It is to be noted that this also applies to the drivers 292A to 295A, 291B to 295B, and 291C to 295C. The driver 291A includes transistors 91 and 94 and resistors 92 and 93. The transistors 91 and 94 in this example are N-channel metal oxide semiconductor (MOS) field effect transistors (FETs). A gate of the transistor 91 corresponds to the positive input terminal of the driver 291A and is supplied with the control signal PU11A, a drain of the transistor 91 is supplied with a voltage V1, and a source of the transistor 91 is coupled to one end of the resistor 92. A gate of the transistor 94 corresponds to the negative input terminal of the driver 291A and is supplied with the control signal PD1A, a drain of the transistor 94 is coupled to one end of the resistor 93, and a source of the transistor 94 is grounded. The one end of the resistor 92 is coupled to the source of the transistor 91, and the other end of the resistor 92 is coupled to the other end of the resistor 93 and the output terminal Tout1A of the transmission device 10. The one end of the resistor 93 is coupled to the drain of the transistor 94, and the other end of the resistor 93 is coupled to the other end of the resistor 92 and the output terminal Tout1A of the transmission device 10. In this example, the sum of a resistance value of on resistance of the transistor 91 and a resistance value of the resistor 92 is about 200[Ω]. Likewise, the sum of a resistance value of on resistance of the transistor 94 and a resistance value of the resistor 93 is about 200[Ω].

With this configuration, the driver controller 28 sets a voltage of the output terminal ToutA to one of the three voltages (the high-level voltage VH, the low-level voltage VL, and the medium-level voltage VM) with use of the control signals PU1A to PU5A and PD1A to PD5A. Specifically, for example, in a case where the voltage of the output terminal ToutA is set to the high-level voltage VH, for example, four of the control signals PU1A to PU5A are set to "1", and the remaining one of the control signals PU1A to PU5A and the control signals PD1A to PD5A are set to "0". Accordingly, in the driver unit 29A, four transistors 91 of which the gates are supplied with "1" are turned on. As a result, the signal SIG1A is set to the high-level voltage VH, and an output termination resistance of the driver unit 29A becomes about 50[Ω]. Moreover, for example, in a case where the voltage of the output terminal Tout1A is set to the low-level voltage VL, for example, four of the control signals PD1A to PD5A are set to "1", and the remaining one of the control signals PD1A to PD5A and the control signals PU1A to PU5A are set to "0". Accordingly, in the driver unit 29A, four transistors 94 of which the gates are supplied with "1" are turned on. As a result, the signal SIG1A is set to the low-level voltage VL, and the output termination resistance of the driver unit 29A becomes about 50[Ω]. Further, in a case where the voltage of the output terminal Tout1A is set to the medium-level voltage VM, for example, two of the control signals PU1A to PU5A are set to "1", the remaining control signals are set to "0", for example, two of the control signals PD1A to PD5A are set to "1", and the remaining control signals are set to "0". Accordingly, in the driver unit 29A, two transistors 91 and two transistors 94 of which the gates are supplied with "1" are turned on, and Thevenin termination is achieved. As a result, the signal SIG1A is set to the medium-level voltage VM, and the output termination resistance of the driver unit 29A becomes about 50[Ω]. Thus, the driver controller 28 sets the voltage of the output terminal ToutA to one of the three voltages with use of the control signals PU1A to PU5A and PD1A to PD5A.

(Reception Device 40)

The reception device 40 includes receivers 41, 42, and 43 and a processor 60, as illustrated in FIG. 1.

The receiver 41 receives the signals SIG1A, SIG1B, and SIG1C, and generates transition signals RxF16 to RxF10, RxR16 to RxR10, and RxP16 to RxP10 on the basis of the signals SIG1A, SIG1B, and SIG1C. The receiver 42 receives the signals SIG2A, SIG2B, and SIG2C, and generates transition signals RxF26 to RxF20, RxR26 to RxR20, and RxP26 to RxP20 on the basis of the signals SIG2A, SIG2B, and SIG2C. The receiver 43 receives the signals SIG3A, SIG3B, and SIG3C, and generates transition signals RxF36 to RxF30, RxR36 to RxR30, and RxP36 to RxP30 on the basis of the signals SIG3A, SIG3B, and SIG3C.

FIG. 10 illustrates a configuration example of the receiver 41. It is to be noted that this also applies to the receivers 42 and 43. The receiver 41 includes resistors 51A, 51B, and 51C, amplifiers 52A, 52B, and 52C, a clock generator 53, flip-flops 54 and 55, a signal generator 56, and deserializers 57 to 59.

The resistors 51A, 51B, and 51C each function as a termination resistor in the communication system 1. One end of the resistor 51A is coupled to an input terminal Tin1A and is supplied with the signal SIG1A, and the other end of the resistor 51A is coupled to other ends of the resistors 51B and 51C. One end of the resistor 51B is coupled to an input terminal Tin1B and is supplied with the signal SIG1B, and the other end of the resistor 51B is coupled to the other ends of the resistors 51A and 51C. One end of the resistor 51C is coupled to an input terminal Tin1C and is supplied with the signal SIG1C, and the other end of the resistor 51C is coupled to the other ends of the resistors 51A and 51B.

Each of the amplifiers 52A, 52B, and 52C outputs a signal corresponding to a difference between a signal at its positive input terminal and a signal at its negative input terminal. The positive input terminal of the amplifier 52A is coupled to the negative input terminal of the amplifier 52C and the one end of the resistor 51A and is supplied with the signal SIG1A, and the negative input terminal of the amplifier 52A is coupled to the positive input terminal of the amplifier 52B and the one end of the resistor 51B and is supplied with the signal SIG1B. The positive input terminal of the amplifier 52B is coupled to the negative input terminal of the amplifier 52A and the one end of the resistor 51B and is supplied with the signal SIG1B, and the negative input terminal of the amplifier 52B is coupled to the positive input terminal of the amplifier 52C and the one end of the resistor 51C and is supplied with the signal SIG1C. The positive input terminal of the amplifier 52C is coupled to the negative input terminal of the amplifier 52B and the one end of the resistor 51C and is supplied with the signal SIG1C, and the negative input terminal of the amplifier 52C is coupled to the positive input terminal of the amplifier 52A and the resistor 51A and is supplied with the signal SIG1A.

With this configuration, the amplifiers 52A, 52B, and 52C respectively output a signal corresponding to a difference AB between the signal SIG1A and the signal SIG1B, a signal corresponding to a difference BC between the signal SIG1B and the signal SIG1C, and a signal corresponding to a difference CA between the signal SIG1C and the signal SIG1A.

FIG. 11 illustrates an operation example of the amplifiers 52A, 52B, and 52C in a case where the receiver receives the symbol "+x". In this example, the voltage of the signal SIG1A is at the high-level voltage VH, the voltage of the signal SIG1B is at the low-level voltage VL, and the voltage of the signal SIG1C is at the medium-level voltage VM. In this case, a current Iin flows in order of the input terminal Tin1A, the resistor 51A, the resistor 51B, and the input terminal Tin1B. Further, the positive input terminal and the negative input terminal of the amplifier 52A are respectively supplied with the high-level voltage VH and the low-level voltage VL to cause the difference AB to be positive. Accordingly, the amplifier 52A outputs "1". Moreover, the positive input terminal and the negative input terminal of the amplifier 52B are supplied with the low-level voltage VL and the medium-level voltage VM to cause the difference BC to be negative. Accordingly, the amplifier 42B outputs "0". Further, the positive input terminal and the negative input terminal of the amplifier 52C are respectively supplied with the medium-level voltage VM and the high-level voltage VH to cause the difference CA to be negative. Accordingly, the amplifier 42C outputs "0".

The clock generator 53 generates the clock signal RxCK on the basis of output signals of the amplifiers 52A, 52B, and 52C.

The flip-flop 54 delays the output signals of the amplifiers 52A, 52B, and 52C by one clock of the clock signal RxCK and outputs the respective output signals. The flip-flop 55 delays three output signals of the flip-flop 54 by one clock of the clock signal RxCK and outputs the respective output signals.

The signal generator 56 generates transition signals RxF9, RxR9, and RxP9 on the basis of the output signals of the flip-flops 54 and 55 and the clock signal RxCK. The transition signals RxF9, RxR9, and RxP9 respectively correspond to the transition signals TxF9, TxR9, and TxP9 in the transmission device 10, and each indicate a symbol transition. The signal generator 56 specifies a symbol transition (FIG. 4) on the basis of a symbol indicated by the output signals of the flip-flop 54 and a symbol indicated by the output signals of the flip-flop 55 to generate the transition signals RxF9, RxR9, and RxP9.

The deserializer 57 deserializes the transition signal RxF9 in order of transition signals RxF10, RxF11, RxF12, RxF13, RxF14, RxF15, and RxF16 on the basis of the transition signal RxF9 and the clock signal RxCK to generate the transition signals RxF16 to RxF10. The transition signals RxF16 to RxF10 respectively correspond to the transition signals TxF16 to TxF10 in the transmission device 10. The deserializer 58 deserializes the transition signal RxR9 in order of transition signals RxR10, RxR11, RxR12, RxR13, RxR14, RxR15, and RxR16 on the basis of the transition signal RxR9 and the clock signal RxCK to generate the transition signals RxR16 to RxR10. The transition signals RxR16 to RxR10 respectively correspond to the transition signals TxR16 to TxR10 in the transmission device 10. The deserializer 59 deserializes the transition signal RxP9 in order of transition signals RxP10, RxP11, RxP12, RxP13, RxP14, RxP15, and RxP16 on the basis of the transition signal RxP9 and the clock signal RxCK to generate the transition signals RxP16 to RxP10. The transition signals RxP16 to RxP10 respectively correspond to the transition signals TxP16 to TxP10 in the transmission device 10. Thus, the deserializers 57 to 59 generate seven groups of the transition signals RxF, RxR, and RxP (the transition signals RxF16 to RxF10, RxR16 to RxR10, and RxP16 to RxP10).

The processor 60 (FIG. 1) performs a demapping process and an error correction process on the basis of the transition signals RxF16 to RxF10, RxR16 to RxR10, and RxP16 to RxP10, the transition signals RxF26 to RxF20, RxR26 to RxR20, and RxP26 to RxP20, and the transition signals RxF36 to RxF30, RxR36 to RxR30, and RxP36 to RxP30.

FIG. 12 illustrates a configuration example of the processor 60. In this drawing, a signal indicated by a heavy line indicates a so-called bus signal including a plurality of bits. The processor 60 includes demappers 61 to 63, a deskew unit 64, a lane synthesizer 65, an error corrector 66, and a memory 67.

The demapper 61 performs a demapping process on the basis of seven groups of the transition signals RxF, RxR, and RxP (the transition signals RxF16 to RxF10, RxR16 to RxR10, and RxP16 to RxP10) to generate 16-bit reception data RxDATA1. Herein, the 16-bit reception data RxDATA1 corresponds to transmission data TxDATA1 in the transmission device 10, and corresponds to one data block DB in the packet PCT illustrated in FIG. 2. The demapper 61 has, for example, a conversion table for conversion of the seven groups of the transition signals RxF, RxR, and RxP into the 16-bit reception data RxDATA1, and generates the 16-bit reception data RxDATA1 with use of the conversion table.

The demapping process to be performed by the demapper 61 is an inverse process of the mapping process in the mapper 31 in the transmission device 10. Referring again to FIG. 5, an example of the demapping process is described below. For example, in a case where the transition signals RxF16 to RxF10 are "1, 0, 1, 0, 0, 0, 0", the demapper 61 sets the reception data RxDATA1 to "1, 1, 1, 1, 1, 1, ro5, po5, ro3, po3, ro2, po2, ro1, po1, ro0, po0" with use of signal values ro5, ro3, ro2, ro1, and ro0 of the transition signals RxR15, RxR13, RxR12, RxR11, and RxR10 and signal values po5, po3, po2, po1, and po0 of the transition signals RxP15, RxP13, RxP12, RxP11, and RxP10. Moreover, for example, in a case where the transition signals RxF16 to RxF10 are "0, 1, 1, 0, 0, 0, 0", the demapper 61 sets the reception data RxDATA1 to "1, 1, 1, 1, 1, 0, ro6, po6, ro3, po3, ro2, po2, ro1, po1, ro0, po0" with use of signal values ro6, ro3, ro2, ro1, and ro0 of the transition signals RxR16, RxR13, RxR12, RxR11, and RxR10 and signal values po6, po3, po2, po1, and po0 of the transition signals RxP16, RxP13, RxP12, RxP11, and RxP10.

Moreover, in a case where the reception data RxDATA1 corresponding to the transition signals RxF16 to RxF10, RxR16 to RxR10, and RxP16 to RxP10 are not present upon performing a demapping process in the payload P3 (FIG. 2) of the packet PCT, the demapper 61 also has a function of activating a signal edet1 indicating occurrence of an demapping error. Further, in a case where such a demapping error occurs, the demapper 61 also has a function of generating a 16-bit signal epos1 indicating a position of the data block DB in which the demapping error occurs in the payload P3.

Furthermore, in a case where such a demapping error occurs, the demapper 61 also has a function of generating a maximum of eighteen pieces of data (candidate data cd0$d$1 to cd17$d$1) as candidates of the reception data RxDATA1. At this occasion, the demapper 61 activates signals corresponding to the generated candidate data cd0$d$1 to cd17$d$1 of signals cd0$en$1 to cd17$en$1. Specifically, for example, in a case where four pieces of candidate data cd0$d$1 to cd3$d$1 are generated, the demapper 61 activates four signals cd0$en$1 to cd3$en$1 corresponding thereto. Moreover, for example, in a case where eight pieces of candidate data cd0$d$1 to cd7$d$1 are generated, the demapper 61 activates eight signals cd0$en$ to cd7$en$1 corresponding thereto.

Likewise, the demapper 62 performs a demapping process on the basis of seven groups of the transition signals RxF, RxR, and RxP (the transition signals RxF26 to RxF20, RxR26 to RxR20, and RxP26 to RxP20) to generate 16-bit reception data RxDATA2. Moreover, in a case where a demapping error occurs, the demapper 62 activates a signal edet2 and generates a 16-bit signal epos2 indicating the position of the data block DB in which the demapping error occurs. Further, the demapper 62 also has a function of generating a maximum of eighteen pieces of data (candidate data cd0$d$2 to cd17$d$2) as candidates of the reception data RxDATA2, and activating signals corresponding to the generated candidate data cd0$d$2 to cd17$d$2 of signals cd0$en$2 to cd17$en$2.

Likewise, the demapper 63 performs a demapping process on the basis of the seven groups of transition signals RxF, RxR, and RxP (the transition signals RxF36 to RxF30, RxR36 to RxR30, and RxP36 to RxP30) to generate 16-bit reception data RxDATA3. Moreover, in a case where a demapping error occurs, the demapper 63 activates a signal edet3, and generates a 16-bit signal epos3 indicating the position of the data block DB in which the demapping error occurs. Further, the demapper 63 also has a function of generating a maximum of eighteen pieces of data (candidate data cd0$d$3 to cd17$d$3) as candidates of the reception data RxDATA3, and activating signals corresponding to the generated candidate data cd0$d$3 to cd17$d$3 of signals cd0$en$3 to cd17$en$3.

The deskew unit 64 performs a deskew process to generate reception data RxDATA11 on the basis of the reception data RxDATA1, generates reception data RxDATA21 on the basis of the reception data RxDATA2, and generates reception data RxDATA31 on the basis of the reception data RxDATA3. At this occasion, the deskew unit 64 generates a signal edet11 on the basis of the signal edet1, generates a signal epos11 on the basis of the signal epos1, generates candidate data cd0$d$11 to cd17$d$11 on the basis of the candidate data cd0$d$1 to cd17$d$1, and generates signals cd0$en$11 to cd17$en$11 on the basis of the signals cd0$en$1 to cd17$en$1. Moreover, the deskew unit 64 generates a signal edet21 on the basis of the signal edet2, generates a signal epos21 on the basis of the signal epos2, generates candidate data cd0$d$21 to cd17$d$21 on the basis of the candidate data cd0$d$2 to cd17$d$2, and generates signals cd0$en$21 to cd17$en$21 on the basis of the signals cd0$en$2 to cd17$en$2. Further, the deskew unit 64 generates a signal edet31 on the basis of the signal edet3, generates a signal epos31 on the basis of the signal epos3, generates candidate data cd0$d$31 to cd17$d$31 on the basis of the candidate data cd0$d$3 to cd17$d$3, and generates signals cd0$en$31 to cd17$en$31 on the basis of the signals cd0$en$3 to cd17$en$3.

The lane synthesizer 65 synthesizes a signal related to the data lane DL1, a signal related to the data lane DL2, and a signal related to the data lane DL3 by time division multiplexing. Specifically, the lane synthesizer 65 synthesizes the reception data RxDATA11, RxDATA21, and RxDATA31 related to the data lanes DL1, DL2, and DL3 to generate 16-bit reception data RxDATA. Likewise, the lane synthesizer 65 synthesizes the signals edet11, edet21, and edet31 related to the data lanes DL1, DL2, and DL3 to generate the signal edet. Moreover, the lane synthesizer 65 synthesizes the signals epos11, epos21, and epos31 related to the data lanes DL1, DL2, and DL3 to generate a 17-bit signal epos. Further, the lane synthesizer 65 synthesizes the candidate data cd0$d$11 to cd17$d$11, cd0$d$21 to cd17$d$21, and cd0$d$31 to cd17$d$31 related to the data lanes DL1, DL2, and DL3 to generate candidate data cd0$d$ to cd17$d$. Each of the candidate data cd0$d$ to cd17$d$ is 16-bit data. Furthermore, the lane synthesizer 65 synthesizes the signals cd0$en$11 to cd17$en$11, cd0$en$21 to cd17$en$21, and cd0$en$31 to cd17$en$31 related to the data lanes DL1, DL2, and DL3 to generate signals cd0$en$ to cd17$en$.

The error corrector 66 performs an error correction process on the basis of the reception data RxDATA, the signals edet and epos, the candidate data cd0$d$ to cd17$d$, and the signals cd0$en$ to cd17$en$.

FIG. 13 illustrates a configuration example of the error corrector 66. The error corrector 66 includes an error correction controller 71, eighteen selectors SEL0 to SEL17, eighteen CRC processors CRC0 to CRC17, a selection controller 74, and a selector 75.

The error correction controller 71 controls an operation of the error corrector 66. Specifically, in a case where the signal edet becomes active, the error correction controller 71 outputs the signal epos at this time as a signal CPOS, outputs the candidate data cd0$d$ to cd17$d$ at this time as candidate data cd0$dd$ to cd17$dd$, respectively, and outputs the signals cd0$en$ to cd17$en$ at this time as signals crc0$en$ to crc17$en$, respectively. Thereafter, the error correction controller 71 maintains the signal CPOS, the candidate data cd0$dd$ to cd17$dd$, and the signals crc0$en$ to crc17$en$ on the basis of the reception data RxDATA until detecting the EoT P5 (FIG. 3) of the packet PCT.

Moreover, in a case where the signal edet becomes active, the error correction controller 71 sets signals corresponding to the active signals cd0$en$ to cd17$en$ of signals S0 to S17 to "1" only for a predetermined period. Specifically, for example, in a case where four signals cd0$en$ to cd3$en$ are active, the error correction controller 71 sets four signals S0 to S3 corresponding thereto to "1" only for a predetermined period. Further, for example, in a case where eight signals cd0$en$ to cd7$en$ are active, the error correction controller 71 sets eight signals S0 to S7 corresponding thereto to "1" only for a predetermined period.

Furthermore, the error correction controller 71 activates a signal EC indicating that the demapping error is corrected upon detection of the EoT P5 of the packet PCT.

The selector SEL0 selects one of the reception data RxDATA and the candidate data cd0dd on the basis of the signal S0, and outputs the selected data. Specifically, in a case where the signal S0 is "0", the selector SEL0 selects the reception data RxDATA, and in a case where the signal S0 is "1", the selector SEL0 selects the candidate data cd0dd. This also applies to the selectors SEL1 to SEL17.

The CRC processor CRC0 performs a CRC check with use of an error detection code P41 (FIG. 2) included in the reception data RxDATA on the basis of data supplied from the selector SEL0. Thereafter, in a case where the signal crc0en is active, the CRC processor CRC0 outputs a result of the check. This also applies to the CRC processors CRC1 to CRC17.

The selection controller 74 generates a signal RES for selection of one from the candidate data cd0dd to cd017dd on the basis of the results of checks in the CRC processors CRC0 to CRC17. Specifically, the selection controller 74 generates the signal RES on the basis of results of checks corresponding to the active signals crc0en to crc17en of the results of the checks in the CRC processors CRC0 to CRC17. At this occasion, the selection controller 74 generates the signal RES for selection of candidate data corresponding to the CRC processor in which the CRC error is not detected from the candidate data cd0dd to cd017dd.

For example, in a case where four signals crc0en to crc3en are active, the selection controller 74 generates the signal RES on the basis of the results of the checks in the four CRC processor CRC0 to CRC3 corresponding thereto. At this occasion, for example, in a case where the CRC error is not detected in the CRC processor CRC0, and the CRC error is detected in the CRC processors CRC1 to CRC3, the selection controller 74 generates the signal RES for selection of the candidate data cd0dd corresponding to the CRC processor CRC0. Moreover, for example, in a case where eight signals crc0en to crc7en are active, the selection controller 74 generates the signal RES on the basis of results of checks in the eight CRC processors CRC0 to CRC7 corresponding thereto. At this occasion, for example, in a case where the CRC error is not detected in the CRC processor CRC7, and the CRC error is detected in the CRC processors CRC0 to CRC6, the selection controller 74 generates the signal RES for selection of the candidate data cd7dd corresponding to the CRC processor CRC7.

The selector 75 selects one from the candidate data cd0dd to cd17dd on the basis of the signal RES, and outputs the selected candidate data as correction data CDATA.

The memory 67 (FIG. 12) stores the reception data RxDATA, the signals EC and CPOS, and the correction data CDATA.

Herein, for example, the signals SIG1A to SIG1C correspond to a specific example of a "plurality of transmission signals" in the present disclosure. The amplifiers 52A, 52B, and 52C correspond to a specific example of a "receiver" in the present disclosure. The signal generator 56 corresponds to a specific example of a "transition signal generator" in the present disclosure. For example, the demapper 61 corresponds to a specific example of a "converter" in the present disclosure. For example, the transition signals RxF16 to RxF10, RxR16 to RxR10, and RxP16 to RxP10 correspond to a specific example of "transition data" in the present disclosure. For example, the reception data RxDATA1 corresponds to a specific example of "reception data" in the present disclosure. For example, the candidate data cd0d1 to cd17d correspond to a specific example of "candidate data" in the present disclosure. The CRC processors CRC0 to CRC17 correspond to a specific example of a "detector" in the present disclosure. The selection controller 74 and the selector 75 correspond to a specific example of a "selection unit" in the present disclosure. The memory 67 corresponds to a specific example of a "storage unit" in the present disclosure.

[Operation and Workings]

Next, description is given of operation and workings of the communication system 1 according to the present embodiment.

(General Operation Outline)

First, a general operation outline of the communication system 1 is described with reference to FIG. 1. The clock generator 14 in the transmission device 10 generates the clock signal TxCK. In the processor 30, the mapper 31 performs a mapping process to generate the transition signals TxF16 to TxF10, TxR16 to TxR10, and TxP16 to TxP10, the mapper 32 performs a mapping process to generate the transition signals TxF26 to TxF20, TxR26 to TxR20, and TxP26 to TxP20, and the mapper 33 performs a mapping process to generate the transition signals TxF36 to TxF30, TxR36 to TxR30, and TxP36 to TxP30. The transmitter 11 generates the signals SIG1A, SIG1B, and SIG1C on the basis of the transition signals TxF16 to TxF10, TxR16 to TxR10, and TxP16 to TxP10. The transmitter 12 generates the signal SIG2A, SIG2B, and SIG2C on the basis of the transition signals TxF26 to TxF20, TxR26 to TxR20, and TxP26 to TxP20. The transmitter 13 generates the signal SIG3A, SIG3B, and SIG3C on the basis of the transition signals TxF36 to TxF30, TxR36 to TxR30, and TxP36 to TxP30.

In the reception device 40, the receiver 41 receives the signals SIG1A, SIG1B, and SIG1C, and generates the transition signals RxF16 to RxF10, RxR16 to RxR10, and RxP16 to RxP10 on the basis of the signals SIG1A, SIG1B, and SIG1C. The receiver 42 receives the signals SIG2A, SIG2B, and SIG2C, and generates the transition signals RxF26 to RxF20, RxR26 to RxR20, and RxP26 to RxP20 on the basis of the signals SIG2A, SIG2B, and SIG2C. The receiver 43 receives the signals SIG3A, SIG3B, and SIG3C, and generates the transition signals RxF36 to RxF30, RxR36 to RxR30, and RxP36 to RxP30 on the basis of the signals SIG3A, SIG3B, and SIG3C. The processor 60 performs a demapping process and an error correction process on the basis of the transition signals RxF16 to RxF10, RxR16 to RxR10, and RxP16 to RxP10, the transition signals RxF26 to RxF20, RxR26 to RxR20, and RxP26 to RxP20, and the transition signals RxF36 to RxF30, RxR36 to RxR30, and RxP36 to RxP30.

(Specific Operation of Processor 60)

In the processor 60 (FIG. 12), the demappers 61, 62, and 63 perform a demapping process to generate the reception data RxDATA1, RxDATA2, and RxDATA3, and the deskew unit 64 and the lane synthesizer 65 generate the reception data RxDATA on the basis of the reception data RxDATA1, RxDATA2, and RxDATA3. Thereafter, the memory 67 stores the reception data RxDATA.

At this occasion, for example, in a case where a demapping error occurs, the demapper 61 generates the 16-bit signal epos1 indicating the position of the data block DB in which the demapping error occurs, and generates a maximum of eighteen pieces of data (the candidate data cd0d1 to cd17d1) as candidates of the reception data RxDATA1. The deskew unit 64 and the lane synthesizer 65 generate the signal epos on the basis of the signal epos1, and generate the candidate data cd0*d* to cd17*d* on the basis of the candidate data cd0*d*1 to cd17*d*1. The error corrector 66 performs a CRC check on the basis of the reception data RxDATA and the candidate data cd0*d* to cd17*d*, and outputs, as the correction data CDATA, the candidate data in which the CRC error does not occur of the candidate data cd0*d* to cd17*d* (cd0*dd* to cd17*dd*). Moreover, the error corrector 66 generates the signal CPOS on the basis of the signal epos. The signal CPOS indicates the position of the data block DB in which the demapping error occurs in the payload P3 of the packet PCT, as with the signal epos. In other words, the signal CPOS indicates a position of data to be replaced with the correction data CDATA in the reception data RxDATA. Thereafter, the error corrector 66 activates the signal EC indicating that the demapping error is corrected. The memory 67 then stores the correction data CDATA and the signal CPOS.

Next, an operation of the processor 60 is described in detail with reference to some examples.

First Operation Example

FIG. 14 illustrates the operation of the communication system 1 in a first operation example, where (A) indicates the transmission data TxDATA1, (B) indicates the transition signals TxF9, TxR9, and TxP9, (C) indicates a sequence of transmission symbols in the transmitter 11, (D) indicates a sequence of reception symbols in the receiver 41, and (E) indicates the transition signals RxF9, RxR9, and RxP9. It is to be noted that, for convenience of description, FIG. 14 is drawn in disregard of circuit delay and transmission delay. Moreover, numerical values of three digits in (B) of FIG. 14 indicate signal values of the transition signals TxF9, TxR9, and TxP9 in this order, and a value in parentheses indicates a decimal value (the signal value VAL) of the numeral values of three digits. Likewise, numerical values of three digits in (E) of FIG. 14 indicate signal values of the transition signals RxF9, RxR9, and RxP9 in this order, and a value in parentheses indicates a decimal value (the signal value VAL) of the numeral values of three digits.

In the transmission device 10, the 16-bit transmission data TxDATA1 in this example is "1, 0, 1, 1, 0, 0, 0, 0, 0, 0, 0, 0, 0, 0, 0, 0", as illustrated in (A) of FIG. 14.

The mapper 31 performs a mapping process as illustrated in FIG. 5 on the basis of the transmission data TxDATA1 to generate the transition signal TxF16 to TxF10, TxR16 to TxR10, and TxP16 to TxP10. Specifically, in this case, the mapper 31 sets the transition signals TxF16 to TxF10 to "0, 0, 0, 0, 0, 1, 1", sets the transition signals TxR16 to TxR10 to "0, 0, 0, 0, 0, 0, 0", and sets the transition signals TxP16 to TxP10 to "0, 0, 0, 0, 0, 0, 0".

The serializer 21 of the transmitter 11 serializes the transition signals TxF10, TxF11, TxF12, TxF13, TxF14, TxF15, and TxF16 in this order to generate the transition signal TxF9. The serializer 22 serializes the transition signals TxR10, TxR11, TxR12, TxR13, TxR14, TxR15, and TxR16 in this order to generate the transition signal TxR9. The serializer 23 serializes the transition signals TxP10, TxP11, TxP12, TxP13, TxP14, TxP15, and TxP16 in this order to generate the transition signal TxP9. As a result, the transition signals TxF9, TxR9, and TxP9 become "100, 100, 000, 000, 000, 000, 000" in order in a period from a timing t12 to a timing t19 ((B) of FIG. 14). In other words, the signal value VAL becomes "4, 4, 0, 0, 0, 0, 0" in order.

The transmission symbol generator 24 of the transmitter 11 generates the transmission symbol on the basis of the transition signals TxF9, TxR9, and TxP9. In this example, the transmission symbol is "+z" in a period from a timing t11 to the timing t12. Accordingly, the transmission symbol becomes "−z, +z, +y, +x, +z, +y, +x" in order in the subsequent period from the timing t12 to the timing t19 ((C) of FIG. 14). The transmitter 11 transmits the sequence of the transmission symbols with use of the signals SIG1A, SIG1B, and SIG1 through the data lane DL1.

In the reception device 40, the receiver 41 receives the signals SIG1A, SIG1B, and SIG1C. At this occasion, in this example, the reception symbols of the receiver 41 are "−z, +z, +y, +x, +z, −x, +x" in order in the period from the timing t12 to the timing t19 ((D) of FIG. 14). In other words, in this example, the transmission symbol "+y" and the reception symbol "−x" are not coincident with each other in a period from a timing t17 to a timing t18, which causes a communication error.

The signal generator 56 of the receiver 41 generates the transition signal RxF9, RxR9, and RxP9 on the basis of the sequence of the reception symbols. In this example, the reception symbol is "+z" in the period from the timing t11 to the timing t12. Accordingly, the transition signals RxF9, RxR9, and RxP9 become "100, 100, 000, 000, 000, 011, 100" in order in the subsequent period from the timing t12 to the timing t19 ((E) of FIG. 14). In other words, the signal value VAL becomes "4, 4, 0, 0, 0, 3, 4" in order.

The deserializer 57 deserializes the transition signal RxF9 in order of the transition signals RxF10, RxF11, RxF12, RxF13, RxF14, RxF15, and RxF16 to generate the transition signals RxF16 to RxF10. In this example, the transition signals RxF16 to RxF10 are "1, 0, 0, 0, 0, 1, 1". The deserializer 58 deserializes the transition signal RxR9 in order of the transition signals RxR10, RxR11, RxR12, RxR13, RxR14, RxR15, and RxR16 to generate the transition signal RxR16 to RxR10. In this example, the transition signal RxR16 to RxR10 are "0, 1, 0, 0, 0, 0, 0". The deserializer 59 deserializes the transition signal RxP9 in order of the transition signals RxP10, RxP11, RxP12, RxP13, RxP14, RxP15, and RxP16 to generate the transition signals RxP16 to RxP10. In this example, the transition signals RxP16 to RxP10 are "0, 1, 0, 0, 0, 0, 0".

The demapper 61 intends to perform a demapping process as illustrated in FIG. 5 on the basis of the transition signals RxF16 to RxF10, RxR16 to RxR10, and RxP16 to RxP10. However, in this example, values "1, 0, 0, 0, 0, 1, 1" of the transition signals RxF16 to RxF10 are not in the conversion table, which does not make it possible for the demapper 61 to perform the demapping process. That is, in order to perform the demapping process using the conversion table, it is necessary for the number of "1"s included in the transition signals RxF16 to RxF10 to be two or less, as illustrated in FIG. 5. In other words, it is necessary for the number of transitions of the signal value VAL to "4" to be two or less. In this example, as illustrated in (E) of FIG. 14, three "1"s are included in the transition signals RxF16 to RxF10. In other words, three transitions of the signal value VAL to "4" are made. Accordingly, a demapping error occurs in the demapper 61.

In a case where the demapping error occurs in such a manner, the demapper 61 generates the 16-bit signal epos1 indicating the position of the data block DB in which the demapping error occurs, and generates the candidate data cd0*d*1 to cd17*d*1.

FIG. 15 illustrates a generation example of candidate data in the demapper 61. As illustrated in (E) of FIG. 14, the reception symbols in this example are "−z, +z, +y, +x, +z, −x, +x" in the period from the timing t12 to the timing t19. Herein, it is assumed that a communication error occurs in one of the seven symbols. The demapper 61 then determines a sequence of symbols that allows for the demapping process with use of the conversion table. In this example, candidate data that may make it possible for the number of transitions of the signal value VAL to "4" to be two or less are generated. There are twelve pieces of such candidate data as illustrated in FIG. 15.

First, it is assumed that a communication error occurs in the symbol "−z" in a period from the timing t12 to the timing t13. In this case, candidates of the symbol in this period are four symbols "+x", "−x", "+y", and "−y". In other words, the symbol "+z" is not a candidate. That is, the reception symbol is the symbol "+z" in a period subsequent thereto, and the symbol "+z" is therefore not a candidate, because the same symbol is not repeated in the communication system 1, as illustrated in FIG. 4. The demapping process is performed with use of the four candidates of the symbol to obtain four pieces of candidate data cd0d1 to cd3d1 illustrated in FIG. 15.

Next, it is assumed that a communication error occurs in the symbol "+z" in a period from the timing t13 to the timing t14. In this case, candidates of the symbol in this period are two symbols "+x" and "−x". In other words, the symbols "+y", "−y", and "−z" are not candidates. That is, in a period subsequent thereto, the reception symbol is the symbol "+y", and the symbol "+y" is therefore not a candidate, and in a period previous thereto, the reception symbol is the symbol "−z", and the symbol "−z" is therefore not a candidate. It is because the same symbol is not repeated in the communication system 1, as illustrated in FIG. 4. Moreover, in the period subsequent thereto, the reception symbol is "+y", the symbol "−y" is therefore not a candidate, because the symbol "−y" does not make it possible for the number of transitions of the signal value VAL to "4" to be two or less. The demapping process is performed with use of the two candidates of the symbol to obtain two pieces of candidate data cd4d1 and cd5d1 illustrated in FIG. 15.

Next, it is assumed that a communication error occurs in the symbol "−x" in a period from the timing t17 to the timing t18. In this case, candidates of the symbol in this period are two symbols "+y" and "−y". In other words, the symbols "+x", "+z", and "−z" are not candidates. That is, in a period subsequent thereto, the reception symbol is the symbol "+x", and the symbol "+x" is therefore not a candidate, and in a period previous thereto, the reception symbol is the symbol "+z", and the symbol "+z" is therefore not a candidate. It is because the same symbol is not repeated in the communication system 1 as illustrated in FIG. 4. Moreover, in the period previous thereto, the reception symbol is the symbol "+z", and the symbol "−z" is therefore not a candidate, because the symbol "−z" does not make it possible for the number of transitions of the signal value VAL to "4" to be two or less. The demapping process is performed with use of the two candidates of the symbol to obtain two pieces of candidate data cd6d1 and cd7d1 illustrated in FIG. 15.

Next, it is assumed that a communication error occurs in the symbol "+x" in a period from the timing t18 to the timing t19. In this case, candidates of the symbol in this period are four symbols "+y", "−y", "+z", and "−z". In other words, the symbols "−x" is not a candidate. That is, in a period previous thereto, the reception symbol is the symbol "−x", and the symbol "−x" is therefore not a candidate, because the same symbol is not repeated in the communication system 1 as illustrated in FIG. 4. The demapping process is performed with use of the four candidates of the symbol to obtain four pieces of candidate data cd8d1 to cd11d1 illustrated in FIG. 15.

It is to be noted that in a period from the timing t14 to the timing t17, there is no candidate of the symbol, because it is not possible for the number of transitions of the signal value VAL to "4" to be two or less.

The demapper 61 generates twelve pieces of candidate data cd0d1 to cd11d1 in such a manner in this example. The deskew unit 64 and the lane synthesizer 65 generate the signal epos on the basis of the signal epos1, and generates twelve pieces of candidate data cd0d to cd11d on the basis of the twelve pieces of candidate data cd0d1 to cd11d1. The error corrector 66 performs a CRC check on the basis of the reception data RxDATA and the twelve pieces of candidate data cd0d to cd11d. In this example, in the CRC check on the basis of the seventh candidate data cd6d1, no CRC error occurs. Accordingly, the error corrector 66 outputs, as the correction data CDATA, the candidate data dc6dd corresponding to the candidate data cd6d1. Moreover, the error corrector 66 generates the signal CPOS on the basis of the signal epos. The memory 67 stores the correction data CDATA and the signal CPOS.

Thus, in the reception device 40, data corresponding to the data block indicated by the signal CPOS in the reception data RxDATA stored in the memory 67 is replaced with the correction data CDATA, which makes it possible to perform error correction.

Second Operation Example

FIG. 16 illustrates the operation of the communication system 1 in a second operation example, where (A) indicates the transmission data TxDATA1, (B) indicates the transition signals TxF9, TxR9, and TxP9, (C) indicates a sequence of transmission symbols in the transmitter 11, (D) indicates a sequence of reception symbols in the receiver 41, and (E) indicates the transition signals RxF9, RxR9, and RxP9.

In the transmission device 10, the 16-bit transmission data TxDATA1 in this example is "0, 0, 0, 0, 1, 0, 0, 0, 0, 0, 0, 0, 0, 0, 0, 0" as illustrated in (A) of FIG. 16.

The mapper 31 performs a mapping process as illustrated in FIG. 5 on the basis of the transmission data TxDATA1 to generate the transition signals TxF16 to TxF10, TxR16 to TxR10, and TxP16 to TxP10. Specifically, in this case, the mapper 31 sets the transition signals TxF16 to TxF10 to "0, 0, 0, 0, 0, 0, 0", sets the transition signals TxR16 to TxR10 to "0, 1, 0, 0, 0, 0, 0", and sets the transition signals TxP16 to TxP10 to "0, 0, 0, 0, 0, 0, 0". As a result, the transition signals TxF9, TxR9, and TxP9 become "000, 000, 000, 000, 000, 010, 010, 000" in order in a period from a timing t22 to a timing t29 ((B) of FIG. 16). In other words, the signal value VAL becomes "0, 0, 0, 0, 0, 2, 0" in order.

The transmission symbol generator 24 of the transmitter 11 generates the transmission symbol on the basis of the transition signals TxF9, TxR9, and TxP9. In this example, the transmission symbol becomes "+y, +x, +z, +y, +x, +y, +x" in order in the period from the timing t22 to the timing t29 ((C) of FIG. 16). The transmitter 11 transmits a sequence of the transmission symbols with use of the signals SIG1A, SIG1B, and SIG1C through the data lane DL1.

In the reception device 40, the receiver 41 receives the signal SIG1A, SIG1B, and SIG1C. At this occasion, in this example, the reception symbols of the receiver 41 are "+y, +x, +z, +y, +x, −x, +x" in order in the period from the timing t22 to the timing t29 ((D) of FIG. 16). That is, in this example, the transmission symbol "+y" and the reception symbol "−x" are not coincident with each other in a period from a timing t27 to a timing t28, which causes a communication error.

The signal generator 56 of the receiver 41 generates the transition signal RxF9, RxR9, and RxP9 on the basis of the sequence of the reception symbols. In this example, the transition signals RxF9, RxR9, and RxP9 become "000, 000, 000, 000, 000, 100, 100" in order in the period from the timing t22 to the timing t29 ((E) of FIG. 16). In other words, the signal value VAL becomes "0, 0, 0, 0, 0, 4, 4" in order. As a result, the transition signals RxF16 to RxF10 become "1, 1, 0, 0, 0, 0, 0", the transition signals RxR16 to RxR10 become "0, 0, 0, 0, 0, 0, 0", and the transition signal RxP16 to RxP10 become "0, 0, 0, 0, 0, 0, 0".

The demapper 61 intends to perform a demapping process as illustrated in FIG. 5 on the basis of the transition signal RxF16 to RxF10, RxR16 to RxR10, and RxP16 to RxP10. However, in this example, values "1, 1, 0, 0, 0, 0, 0" of the transition signal RxF16 to RxF10 are not in the conversion table, which does not make it possible for the demapper 61 to perform the demapping process. That is, in order to perform the demapping process with use of the conversion table as illustrated in FIG. 5, both the values of two transition signals RxF16 and RxF15 are not supposed to be "1". In this example, both the values of the two transition signal RxF16 and RxF15 are "1" as illustrated in (E) of FIG. 16. Accordingly, a demapping error occurs in the demapper 61.

FIG. 17 illustrates a generation example of candidate data in the demapper 61. In this example, the reception symbols are "+y, +x, +z, +y, +x, −x, +x" in the period from the timing t22 to the timing t29, as illustrated in (E) of FIG. 16. Herein, it is assumed that a communication error occurs in one of the seven symbols. The demapper 61 then determines a sequence of symbols that allows for the demapping process with use of the conversion table. In this example, candidate data in which one or both of the values of two transition signals RxF16 and RxF15 are "0" are generated. There are eleven pieces of such candidate data as illustrated in FIG. 15.

First, it is assumed that a communication error occurs in the symbol "+x" in a period from a timing t26 to a timing t27. In this case, candidates of the symbol in this period are three symbols "−y", "+z", and "−z". In other words, the symbols "−x" and "+y" are not candidates. That is, in a period subsequent thereto, the reception symbol is the symbol "−x", and the symbol "−x" is therefore not a candidate, and in a period previous thereto, the reception symbol is the symbol "+y", and the symbol "+y" is therefore not a candidate. It is because the same symbol is not repeated in the communication system 1 as illustrated in FIG. 4. The demapping process is performed with use of the three candidates of the symbol to obtain three pieces of candidate data cd0d1 to cd2d1 illustrated in FIG. 17.

Next, it is assumed that a communication error occurs in the symbol "−x" in a period from the timing t27 to the timing t28. In this case, candidates of the symbol in this period are four symbols "+y", "−y", "+z", and "−z". In other words, the symbol "+x" is not a candidate. That is, in a period subsequent thereto and a period previous thereto, the reception symbol is "+x", and the symbol "+x" is therefore not a candidate, because the same symbol is not repeated in the communication system 1 as illustrated in FIG. 4. The demapping process is performed with use of the four candidates of the symbol to obtain four pieces of candidate data cd3d1 to cd6d1 illustrated in FIG. 17.

Next, it is assumed that a communication error occurs in the symbol "+x" in a period from the timing t28 to the timing t29. In this case, candidates of the symbol in this period are four symbols "+y", "−y", "+z", and "−z". In other words, the symbol "−x" is not a candidate. That is, in a period previous thereto, the reception symbol is the symbol "−x", and the symbol "−x" is therefore not a candidate, because the same symbol is not repeated in the communication system 1 as illustrated in FIG. 4. The demapping process is performed with use of the four candidates of the symbol to obtain four pieces of candidate data cd7d1 to cd10d1 illustrated in FIG. 17.

It is to be noted in a period from the timing t22 to the timing t26, there is no candidate of the symbol, because it is not possible for one or both of the values of two transition signals RxF16 and RxF15 to be "0".

The demapper 61 generates eleven pieces of candidate data cd0d1 to cd10d1 in such a manner in this example. The deskew unit 64 and the lane synthesizer 65 generate the signal epos on the basis of the signal epos1, and generate eleven pieces of candidate data cd0d to cd10d on the basis of eleven pieces of candidate data cd0d1 to cd10d1. The error corrector 66 performs a CRC check on the basis of the reception data RxDATA and twelve pieces of candidate data cd0d to cd10d. In this example, in the CRC check on the basis of the fourth candidate data cd3d1, no CRC error occurs. Accordingly, the error corrector 66 outputs, as the correction data CDATA, the candidate data dc3dd corresponding to the candidate data cd3d1. Moreover, the error corrector 66 generates the signal CPOS on the basis of the signal epos. The memory 67 stores the correction data CDATA and the signal CPOS.

Thus, in the reception device 40, data corresponding to the data block indicated by the signal CPOS in the reception data RxDATA stored in the memory 67 is replaced with the correction data CDATA, which makes it possible to perform error correction.

As described above, in the communication system 1, in a case where a demapping error occurs, a plurality of pieces of candidate data are generated, and the CRC check is performed with use of the plurality of pieces of candidate data, which makes it possible to perform error correction with use of candidate data in which no CRC error occurs. This makes it possible to enhance communication quality. As a result, for example, it is possible to reduce a bit error rate, and it is also possible to perform longer-range data transmission with use of an inexpensive cable, for example.

Moreover, in the communication system 1, the CRC check is performed with use of the error detection code P41, which makes it possible to achieve efficient data transmission. That is, for example, in a case where an error correction code or 10B8B conversion is used, more redundancy bits are necessary, which causes a possibility of reduction in data transmission efficiency. In contrast, in the communication system 1, the CRC check is performed with use of the error detection code P41, which makes it possible to reduce redundancy bits. This makes it possible to achieve efficient data transmission.

[Effects]

As described above, in the present embodiment, in a case where a demapping error occurs, a plurality of pieces of candidate data are generated, and the CRC check is performed with use of the plurality of pieces of candidate data, which makes it possible to enhance communication quality.

In the present embodiment, the CRC check is performed with use of the error detection code, which makes it possible to achieve efficient data transmission.

Modification Example 1

In the foregoing embodiment, data transmission is performed with use of three data lane DL1 to DL3; however, the embodiment is not limited thereto. For example, data transmission may be performed with use of two or less data lanes or four or more data lanes in place of the three data lanes. A communication system 1A that performs data transmission with use of one data lane is described in detail below.

FIG. 18 illustrates a configuration example of the communication system 1A. The communication system 1A includes a transmission device 10A and a reception device 40A. The transmission device 10A transmits data to the reception device 40A through one data lane DL1. The transmission device 10A includes the clock generator 14, a processor 30A, and the transmitter 11. The processor 30A includes the mapper 31. The reception device 40A receives data transmitted from the transmission device 10A through the one data lane DL1. The reception device 40A includes the receiver 41 and a processor 60A.

FIG. 19 illustrates a configuration example of the processor 60A. The processor 60A includes the demapper 61, an error corrector 66A, and a memory 67A.

The demapper 61 performs a demapping process on the basis of seven groups of transition signals RxF, RxR, and RxP (the transition signal RxF16 to RxF10, RxR16 to RxR10, and RxP16 to RxP10) to generate 16-bit reception data RxDATA. Moreover, in a case where a demapping error occurs, the demapper 61 activates the signal edet, and generates the 16-bit signal epos indicating the position of the data block DB in which the demapping error occurs. Further, the demapper 61 also has a function of generating a maximum of eighteen pieces of data (candidate data cd0d to cd17d) as candidates of the reception data RxDATA1, and activating signals corresponding to the generated candidate data cd0d to cd17d of the signals cd0en to cd17en.

The error corrector 66A performs an error correction process on the basis of the reception data RxDATA, the signal edet, the 16-bit signal epos, the candidate data cd0d to cd17d, and the signals cd0en to cd17en. Thereafter, the error corrector 66A generates the signal EC, the 16-bit signal CPOS, and the correction data CDATA. The configuration of the error corrector 66A is similar to the configuration of the error corrector 66 according to the foregoing embodiment (FIG. 13). The memory 67A stores the reception data RxDATA, the signals EC and CPOS, and the correction data CDATA.

2. Application Example

Next, description is given of application examples of the communication systems described in the foregoing embodiment and modification example.

FIG. 20 illustrates an external appearance of a smartphone 300 (a multi-functional mobile phone) to which the communication system according to any of the foregoing embodiment, etc. is applied. Various devices are mounted in the smartphone 300. The communication system according to any of the foregoing embodiment, etc. is applied to a communication system that exchanges data between these devices.

FIG. 21 illustrates a configuration example of an application processor 310 used in the smartphone 300. The application processor 310 includes a CPU (central processing unit) 311, a memory controller 312, a power source controller 313, an external interface 314, a GPU (graphics processing unit) 315, a media processor 316, a display controller 317, and a MIPI (mobile industry processor interface) interface 318. In this example, the CPU 311, the memory controller 312, the power source controller 313, the external interface 314, the GPU 315, the media processor 316, and the display controller 317 are coupled to a system bus 319 to allow for mutual data exchange through the system bus 319.

The CPU 311 processes various pieces of information handled in the smartphone 300 in accordance with a program. The memory controller 312 controls the memory 501 used in a case where the CPU 311 performs information processing. The power source controller 313 controls a power source of the smartphone 300.

The external interface 314 is an interface for communication with external devices. In this example, the external interface 314 is coupled to a wireless communication unit 502 and an image sensor 410. The wireless communication unit 502 carries out wireless communication with mobile phone base stations. The wireless communication unit 502 includes, for example, a baseband unit, an RF (radio frequency) front end unit, etc. The image sensor 410 acquires an image, and includes, for example, a CMOS sensor.

The GPU 315 performs image processing. The media processor 316 processes information such as voice, characters, and graphics. The display controller 317 controls the display 504 through the MIPI interface 318. The MIPI interface 318 transmits an image signal to the display 504. As the image signal, it is possible to use, for example, a YUV-format signal, an RGB-format signal, etc. The MIPI interface 318 operates on the basis of a reference clock supplied from an oscillator circuit 330 including a crystal resonator. For example, the communication system according to any of the foregoing embodiments, etc. is applied to the communication system between the MIPI interface 318 and the display 504.

FIG. 22 illustrates a configuration example of the image sensor 410. The image sensor 410 includes a sensor 411, an ISP (image signal processor) 412, a JPEG (joint photographic experts group) encoder 413, a CPU 414, a RAM (random access memory) 415, a ROM (read only memory) 416, a power source controller 417, an I$^2$C (inter-integrated circuit) interface 418, and an MIPI interface 419. In this example, these respective blocks are coupled to a system bus 420 to allow for mutual data exchange through the system bus 420.

The sensor 411 acquires an image, and includes, for example, a CMOS sensor. The ISP 412 performs predetermined processing on the image acquired by the sensor 411. The JPEG encoder 413 encodes the image processed by the ISP 412 to generate a JPEG-format image. The CPU 414 controls respective blocks of the image sensor 410 in accordance with a program. The RAM 415 is a memory used in a case where the CPU 414 performs information processing. The ROM 416 stores a program to be executed in the CPU 414, a setting value obtained by calibration, etc. The power source controller 417 controls a power source of the image sensor 410. The I$^2$C interface 418 receives a control signal from the application processor 310. Although not illustrated, the image sensor 410 also receives a clock signal from the application processor 310, in addition to the control signal. Specifically, the image sensor 410 is configured to be operable on the basis of clock signals of various frequencies. The MIPI interface 419 transmits an image signal to the application processor 310. As the image signal, it is possible to use, for example, a YUV-format signal, an RGB-format signal, etc. The MIPI interface 419 operates on the basis of a reference clock supplied from an oscillator circuit 430 including a crystal resonator, for example. For example, the communication system according to any of the foregoing embodiments, etc. is applied to a communication system between the MIPI interface 419 and the application processor 310.

Although the present technology has been described above with reference to some embodiments, modification examples, and application examples to electronic apparatuses, the present technology is not limited thereto, and may be modified in a variety of ways.

In the foregoing embodiment, etc., for example, in a case where the voltage of the output terminal Tout1A is set to the medium-level voltage, for example, two of the control signals PU1A to PU5A are set to "1" and the remaining signals are set to "0" and, for example, two of the control signal PD1A to PD5A are set to "1" and the remaining signals are set to "1"; however, the foregoing embodiment, etc. are not limited thereto. Alternatively, for example, all of the control signals PU1A to PU5A and PD1A to PD5A may be set to "0". Accordingly, in the driver unit 29A of the transmitter 11, five transistors 91 and five transistors 94 may be turned off, and the output impedance becomes high impedance. At this occasion, the voltage of the output terminal ToutA is set to the medium-level voltage VM by the resistors 51A to 51C of the receiver 41.

Moreover, in the foregoing embodiment, etc., for example, in a case where the signal edet becomes active, the error correction controller 71 of the error corrector 66 outputs the candidate data cd0$d$ to dc17$d$ at this time as the candidate data cd0$dd$ to cd17$dd$, and maintains the candidate data cd0$dd$ to cd17$dd$ until detecting the EoT P5 of the packet PCT (FIG. 3). In other words, in this example, one or less demapping error occurs in the packet PCT. However, the foregoing embodiments, etc. are not limited thereto, and the error corrector may be configured to cope with two or more demapping errors.

Note that the effects described in the present specification are illustrative and non-limiting, and other effects may be included.

It is to be noted that the present technology may include the following configurations.

(1)

A reception device, including:

a receiver that generates a symbol signal indicating a sequence of symbols on the basis of a plurality of transmission signals;

a transition signal generator that generates a transition signal indicating a sequence of symbol transitions on the basis of the symbol signal; and a converter that repeats an operation of converting transition data including a predetermined number of the symbol transitions into reception data to convert the sequence of the symbol transitions into a sequence of reception data, and generates, in a case where the sequence of the symbol transitions includes first transition data that is not convertible into the reception data, candidate data as a candidate of the reception data on the basis of the first transition data.

(2)

The reception device according to (1), further including:

a detector; and a selection unit, in which the candidate data includes a plurality of pieces of candidate data, the detector detects an error with use of each of the plurality of pieces of candidate data, and the selection unit selects one of the plurality of pieces of candidate data on the basis of a result of detection by the detector.

(3)

The reception device according to (2), in which the plurality of transmission signals include an error detection symbol, and the detector detects an error on the basis of the error detection symbol.

(4)

The reception device according to (2) or (3), further including a storage unit that stores the sequence of the reception data and the candidate data selected by the selection unit.

(5)

The reception device according to any one of (1) to (4), in which in a case where the first transition data is not convertible, the converter also generates position data indicating a position of the first transition data in the sequence of the symbol transitions in addition to the candidate data.

(6)

The reception device according to any one of (1) to (5), in which the converter has a conversion table in which a plurality of pieces of transition data and a plurality of pieces of reception data correspond to each other, and the converter converts second transition data included in the sequence of the symbol transitions into reception data corresponding to the second transition data with use of the conversion table.

(7)

The reception device according to (6), in which the converter generates the candidate data in a case where the conversion table does not include the first transition data.

(8)

The reception device according to (6) or (7), in which in each of the plurality of pieces of transition data included in the conversion table, a number of first symbol transitions indicating a transition from a first symbol to a second symbol is a number N or less, and the converter generates the candidate data in a case where the first transition data includes more than the number N of the first symbol transitions.

(9)

The reception device according to any one of (1) to (8), in which the plurality of transmission signals include three transmission signals, and each of the transmission signals makes a transition involving three signal levels.

(10)

A reception method, including:

generating a symbol signal indicating a sequence of symbols on the basis of a plurality of transmission signals;

generating a transition signal indicating a sequence of symbol transitions on the basis of the symbol signal;

repeating an operation of converting transition data including a predetermined number of the symbol transitions into reception data to convert the sequence of the symbol transitions into a sequence of reception data; and generating, in a case where the sequence of the symbol transitions includes first transition data that is not convertible into the reception data, candidate data as a candidate of the reception data on the basis of the first transition data.

(11)

A communication system, including:

a transmission device that transmits a plurality of transmission signals; and a reception device that receives the plurality of transmission signals, in which the reception device includes:

a receiver that generates a symbol signal indicating a sequence of symbols on the basis of a plurality of transmission signals, a transition signal generator that generates a transition signal indicating a sequence of symbol transitions on the basis of the symbol signal, and a converter that repeats an operation of converting transition data including a predetermined number of pieces of the symbol transition data into reception data to convert the sequence of the symbol transitions into a sequence of reception data, and, in a case where the sequence of the symbol transitions includes first transition data that is not convertible into the reception data, generates candidate data as a candidate of the reception data on the basis of the first transition data.

(12)

The communication system according to (11), in which the transmission device is an image sensor, and the reception device is a processor that processes an image acquired by the image sensor.

This application claims the benefit of Japanese Priority Patent Application JP2015-177241 filed on Sep. 9, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A reception device, comprising:
a receiver that generates a symbol signal indicating a sequence of symbols on a basis of a plurality of transmission signals;
a transition signal generator that generates a transition signal indicating a sequence of symbol transitions on a basis of the symbol signal; and
a converter that repeats an operation of converting transition data including a predetermined number of the symbol transitions into reception data to convert the sequence of the symbol transitions into a sequence of reception data, and generates, in a case where the sequence of the symbol transitions includes first transition data that is not convertible into the reception data, candidate data as a candidate of the reception data on a basis of the first transition data.

2. The reception device according to claim 1, further comprising:
a detector; and
a selection unit,
wherein the candidate data includes a plurality of pieces of candidate data,
the detector detects an error with use of each of the plurality of pieces of candidate data, and
the selection unit selects one of the plurality of pieces of candidate data on a basis of a result of detection by the detector.

3. The reception device according to claim 2, wherein
the plurality of transmission signals include an error detection symbol, and
the detector detects an error on a basis of the error detection symbol.

4. The reception device according to claim 2, further comprising a storage unit that stores the sequence of the reception data and the candidate data selected by the selection unit.

5. The reception device according to claim 1, wherein in a case where the first transition data is not convertible, the converter also generates position data indicating a position of the first transition data in the sequence of the symbol transitions in addition to the candidate data.

6. The reception device according to claim 1, wherein
the converter has a conversion table in which a plurality of pieces of transition data and a plurality of pieces of reception data correspond to each other, and
the converter converts second transition data included in the sequence of the symbol transitions into reception data corresponding to the second transition data with use of the conversion table.

7. The reception device according to claim 6, wherein the converter generates the candidate data in a case where the conversion table does not include the first transition data.

8. The reception device according to claim 6, wherein
in each of the plurality of pieces of transition data included in the conversion table, a number of first symbol transitions indicating a transition from a first symbol to a second symbol is a number N or less, and
the converter generates the candidate data in a case where the first transition data includes more than the number N of the first symbol transitions.

9. The reception device according to claim 1, wherein
the plurality of transmission signals include three transmission signals, and
each of the transmission signals makes a transition involving three signal levels.

10. A reception method, comprising:
generating a symbol signal indicating a sequence of symbols on a basis of a plurality of transmission signals;
generating a transition signal indicating a sequence of symbol transitions on a basis of the symbol signal;
repeating an operation of converting transition data including a predetermined number of the symbol transitions into reception data to convert the sequence of the symbol transitions into a sequence of reception data; and
generating, in a case where the sequence of the symbol transitions includes first transition data that is not convertible into the reception data, candidate data as a candidate of the reception data on a basis of the first transition data.

11. A communication system, comprising:
a transmission device that transmits a plurality of transmission signals; and
a reception device that receives the plurality of transmission signals, wherein
the reception device includes:
a receiver that generates a symbol signal indicating a sequence of symbols on a basis of the plurality of transmission signals,
a transition signal generator that generates a transition signal indicating a sequence of symbol transitions on a basis of the symbol signal, and
a converter that repeats an operation of converting transition data including a predetermined number of the symbol transitions into reception data to convert the sequence of the symbol transitions into a sequence of reception data, and generates, in a case where the sequence of the symbol transitions includes first transition data that is not convertible into the reception data, candidate data as a candidate of the reception data on a basis of the first transition data.

12. The communication system according to claim 11, wherein
the transmission device is an image sensor, and
the reception device is a processor that processes an image acquired by the image sensor.

* * * * *